(12) United States Patent
Das Sharma et al.

(10) Patent No.: US 12,332,752 B2
(45) Date of Patent: Jun. 17, 2025

(54) HARDWARE LOGGING FOR LANE MARGINING AND CHARACTERIZATION

(71) Applicant: Intel Corporation, Santa Clara, CA (US)

(72) Inventors: Debendra Das Sharma, Saratoga, CA (US); Michelle C. Jen, Mountain View, CA (US); Swadesh Choudhary, Mountain View, CA (US); Raghucharan Boddupalli, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 755 days.

(21) Appl. No.: 17/485,180

(22) Filed: Sep. 24, 2021

(65) Prior Publication Data

US 2022/0012140 A1 Jan. 13, 2022

(51) Int. Cl.
*G06F 11/14* (2006.01)
*G06F 13/42* (2006.01)

(52) U.S. Cl.
CPC ...... *G06F 11/1471* (2013.01); *G06F 13/4282* (2013.01); *G06F 2201/82* (2013.01); *G06F 2213/0026* (2013.01)

(58) Field of Classification Search
CPC ............. G06F 11/1471; G06F 11/0778; G06F 11/08; G06F 11/1004; G06F 13/4282; G06F 2201/82; G06F 2201/81; G06F 2201/84; G06F 2213/0026; Y02D 10/00; H04L 1/0041; H04L 1/1835
See application file for complete search history.

(56) References Cited

U.S. PATENT DOCUMENTS

| | | | |
|---|---|---|---|
| 2002/0172164 A1* | 11/2002 | Chou | H04L 1/1671 370/429 |
| 2018/0248650 A1 | 8/2018 | Sharma | |
| 2020/0012555 A1* | 1/2020 | Das Sharma | H04L 1/0083 |
| 2020/0226018 A1 | 7/2020 | Sharma | |
| 2020/0364129 A1* | 11/2020 | Das Sharma | G06F 11/3027 |
| 2021/0050941 A1 | 2/2021 | Sharma et al. | |
| 2021/0089418 A1* | 3/2021 | Das Sharma | G06F 11/2215 |
| 2022/0116138 A1* | 4/2022 | Das Sharma | G06F 13/4027 |

OTHER PUBLICATIONS

EPO; Extended European Search Report issued in EP Patent Application No. 22188846.4, dated Jan. 31, 2023; 6 pages.
Intel Corporation; "Intel 7500 Chipset Datasheet," retrieved from the Internet: https://www.intel.es/content/dam/doc/datasheet/7500-chipset-datasheet.pdf; Mar. 31, 2010; 74 pages.

\* cited by examiner

*Primary Examiner* — Matthew M Kim
*Assistant Examiner* — Matthew N Putaraksa
(74) *Attorney, Agent, or Firm* — Alliance IP, LLC

(57) ABSTRACT

A device includes a port with a replay buffer and protocol logic to receive a flit in a sequence of flits to be sent on a point-to-point link and determine an error in the flit. Based on the error, a copy of the flit is stored in a first position within the replay buffer as well as a copy of a next flit received in the sequence of flits, which is stored in a second position within the replay buffer. The copies of the flits are then written to a register for access by software.

20 Claims, 16 Drawing Sheets

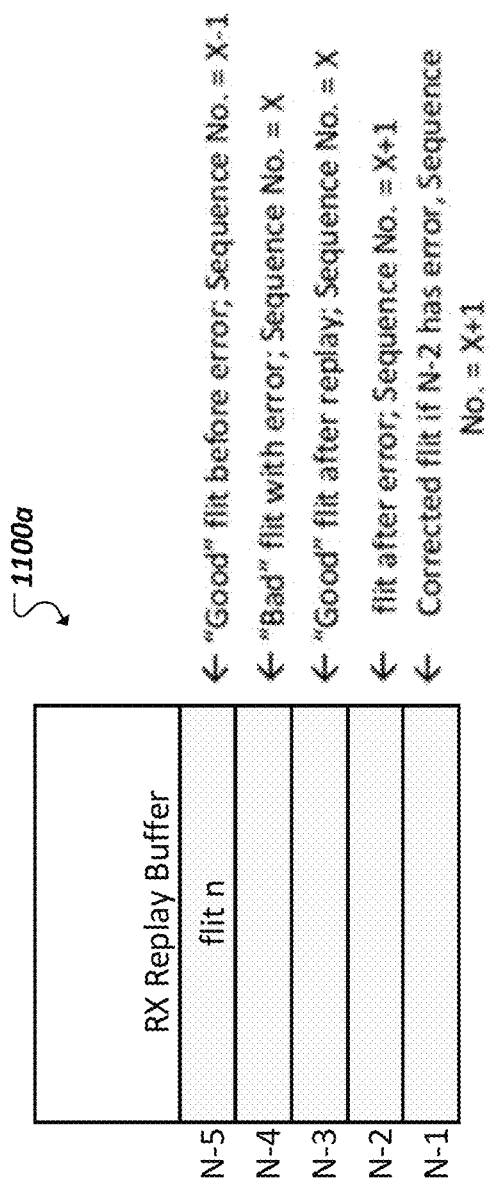
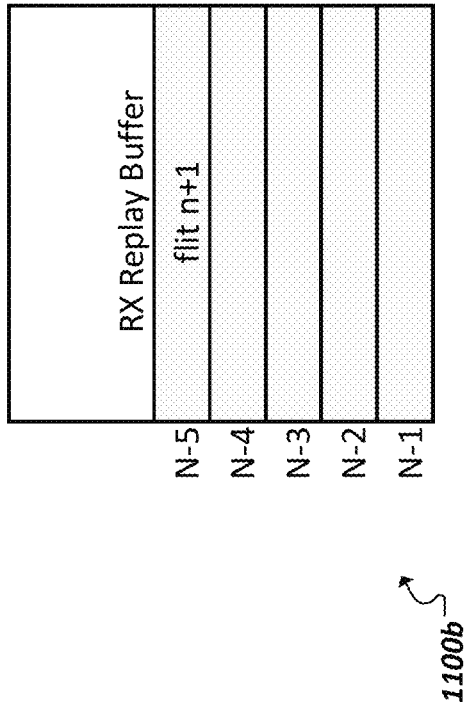
FIG. 11A
FIG. 11B

HARDWARE LOGGING FOR LANE MARGINING AND CHARACTERIZATION

FIELD

This disclosure pertains to computing system, and in particular (but not exclusively) to computer interfaces.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc. As the processing power grows along with the number of devices in a computing system, the communication between sockets and other devices becomes more critical. Accordingly, interconnects, have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures. Interconnect architectures may be based on a variety of technologies, including Peripheral Component Interconnect Express (PCIe), Universal Serial Bus, and others.

BRIEF DESCRIPTION OF THE DRAWINGS

FIGS. 11A-11F illustrate the example progression of logging flits in a replay buffer during an example logging mode.

DETAILED DESCRIPTION

Figure 1:
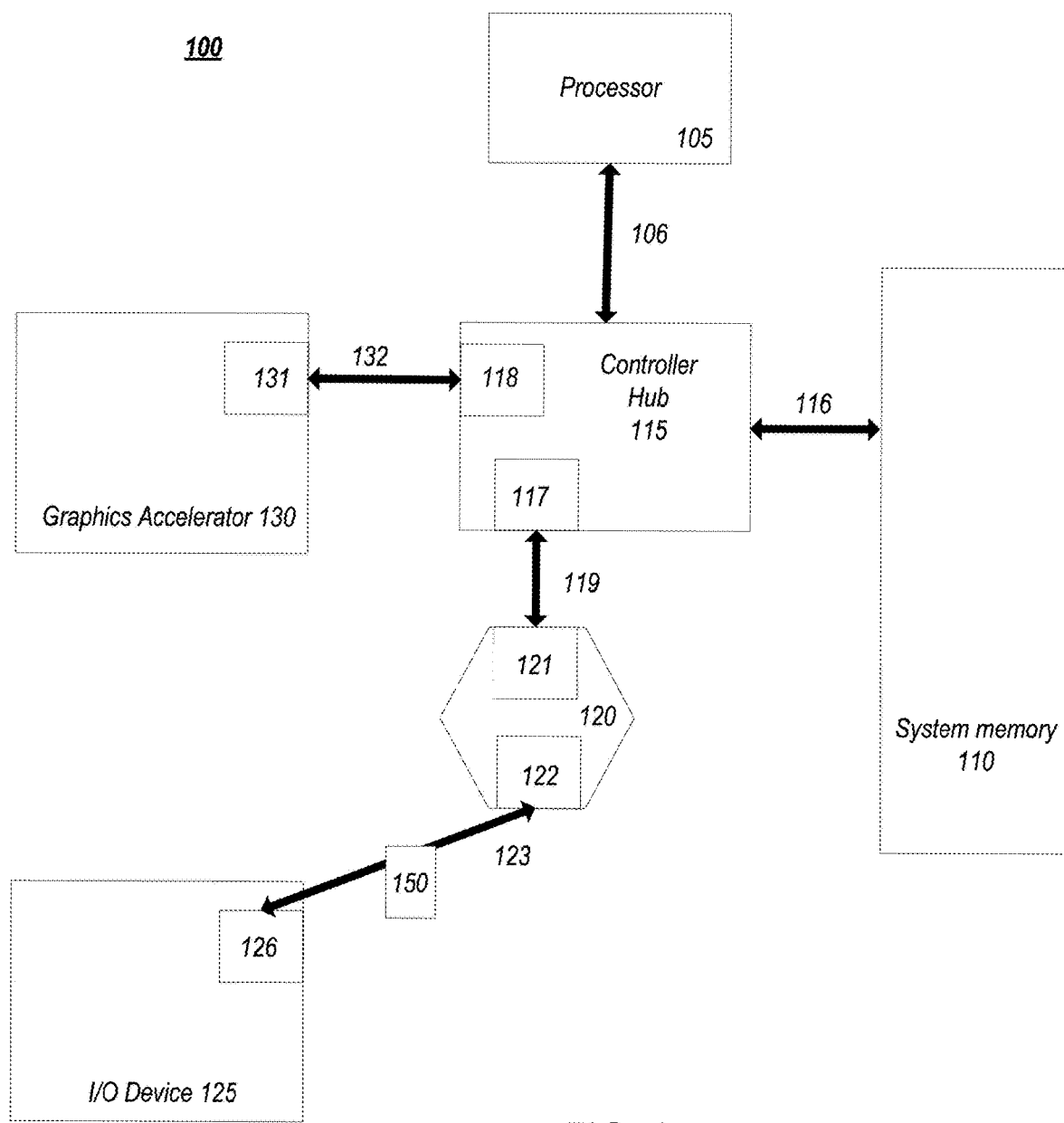
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the principles and solutions discussed in this disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the solutions described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, solid state memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. It should be appreciated that one or more of the components (e.g., 105, 110, 115, 120, 125, 130) illustrated in FIG. 1 can be enhanced to execute, store, and/or embody logic to implement one or more of the features described herein.

Figure 2:
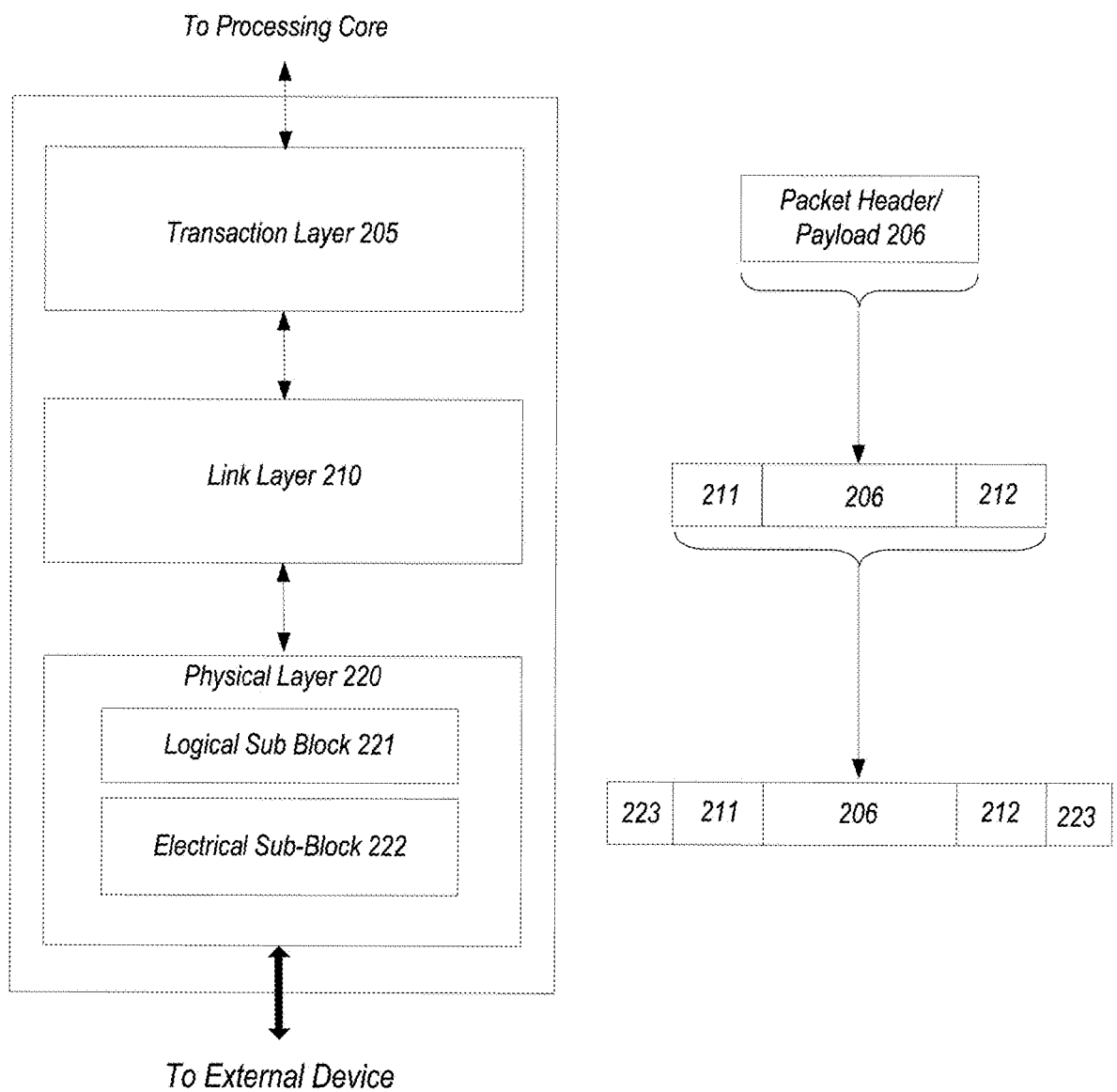
FIG. 2 illustrates an embodiment of an interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components.

Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-based flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message transactions are defined to support in-band communication between PCIe agents.

Therefore, in one embodiment, transaction layer 205 assembles packet header/payload 156. Format for current packet headers/payloads may be found in the PCIe specification at the PCIe specification website.

Figure 3:
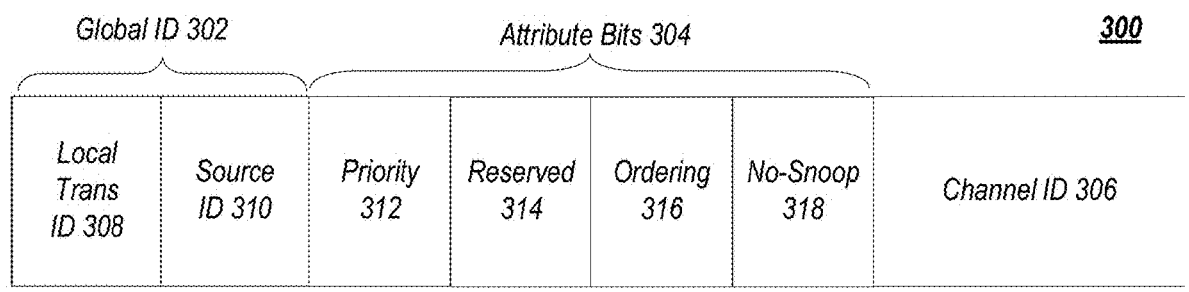
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
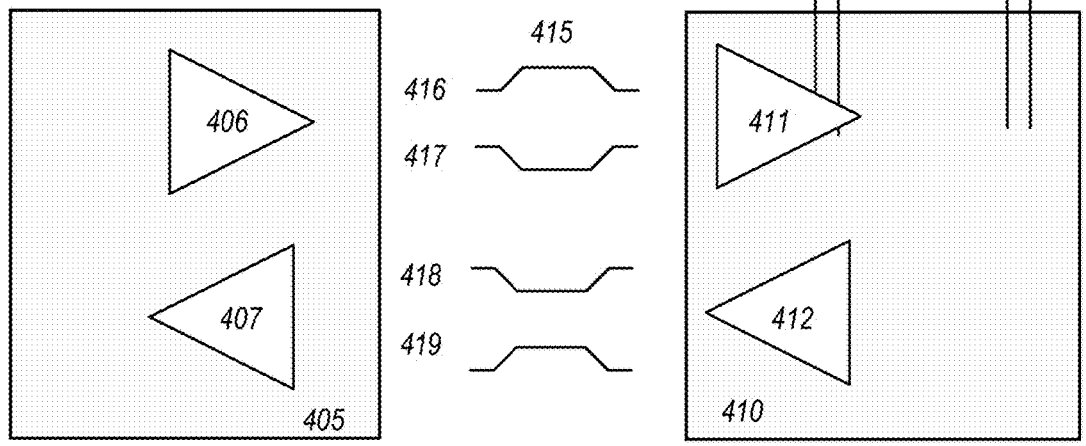
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/412 and a receive pair 411/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider. In some implementations, each symmetric lane contains one transmit differential pair and one receive differential pair. Asymmetric lanes can contain unequal ratios of transmit and receive pairs. Some technologies can utilize symmetric lanes (e.g., PCIe), while others (e.g., DisplayPort) may not and may even including only transmit or only receive pairs, among other examples.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In PCIe, rapid advancements are taking place as the protocol evolves from generation 4.0 to generations 5.0 and 6.0. PCIe 4.0 may support 16 lane links with effective bandwidths of 64 GB/s and extended support for retimers and other features. PCIe 5.0 maintains the 16 lane link width, while doubling the effective bandwidth to 128 GB/s. To maintain these advances in bandwidth, PCIe 6.0 preserves the 16 lane link and adopts pulse amplitude modulation (PAM) encoding (e.g., PAM4 encoding), as opposed to PCIe's traditional non-return-to-zero (NRZ) encoding (e.g., 8b/10b, 128b/130b), to increase the number of bits that may be sent on a serial channel within a single unit interval (UI). Accordingly, PCIe 6.0 further doubles bandwidth to 64 GT/s from 32 GT/s in PCIe 5.0 thereby enabling 256 GB/s of bidirectional bandwidth. Such links may be valuably applied to couple devices such as a deep learning and artificial intelligence hardware accelerator devices; high speed graphic processor units, tensor processor units, and other deep learning processors; high-speed memory; and other hardware in a variety of emerging computing applications, from deep learning applications, autonomous vehicles, robotics, and high performance memory architectures, among other examples. PCIe 6.0 further includes low-latency Forward Error Correction (FEC) and other features to improve bandwidth efficiency, while maintaining backward compatibility with previous PCIe generations and similar channel reach to what is available in PCIe 5.0.

While high-speed PAM4 encoding allows links to realize new and improved applications, such links may be more susceptible to errors. In some implementations, a link and corresponding protocol may be configured to operate in multiple modes, such as a flit mode when high-speed PAM4 encoding is utilized and another (e.g., non-flit) mode when lower speed encoding (e.g., 8b/10b, 128b/130b NRZ) is used. For instance, a higher speed mode may utilize and particularly benefit from Forward Error Correction. Accordingly, a flit mode may be implemented, which subdivides the transmission of a single packet into a set of one or more defined flow control units, or "flits," at the data link or logical PHY layer. However, such features may complicate parsing of the packet at the receiver. Each flit may include a respective header with information corresponding to the flit and packet, allowing some information traditionally reserved for the packet header to be omitted when redundant. In some implementations, two (or more) separate packet header formats may be defined for an interconnect (e.g., for PCIe 6.0-based interconnects), where a first packet header format is utilized for a mode utilizing flits for the packet transfer, and a different, second packet header format is utilized for a mode that does not utilize flits (e.g., a legacy mode defined in the protocol), among other example implementations. In some implementations it may be desirable to utilize flits for packet transfer when operating in lower speed modes (e.g., 8b/10b, 128b/130b NRZ).

In the case of PCIe, the transaction layer packet (TLP) header structure has evolved slowly but remained mostly unchanged. With the adoption of PAM4 encoding and a shift to flit-based data integrity with PCIe 6.0, a new, revised TLP header format may be utilized. The new, flit-mode TLP header may also address the reality that existing PCIe TLP headers lacks remaining reserved bits to expand the features and information, which may be communicated in corresponding packet header fields. In one example implementations, a flit-mode TLP header may replace the traditional, orthogonal, Format (Fmt) and Type fields to a fully-decoded 8-bit TLP Type field, which may be encoded with values to indicate all (or considerably all) existing TLP Types in PCIe, while adding new TLP types for no-op (NOP) and End Bad (EDB) packets types. Indeed, with flit mode, any number of NOP TLPs may be transmitted before or after any other TLP, with NOP TLPs discarded without effect by the receiver. Further the flit-mode TLP header may add new expanded header elements to include what had previously been communicated using TLP Prefixes and other mechanisms in PCIe, including Process Address Space Identifier (PASID), TLP Processing Hints, and Secure TLPs, among other examples. Other example modifications may include the addition of an 8-bit Segment ID (SBDF) to Requester and Completer ID, increasing the Tag field bits (e.g., 12, 14, or 16 bits), removing outdated fields and elements (e.g., the "Byte Count" field), among other example modifications.

Among the example benefits, which may be realized through a flit-mode packet header, the header may provide the ability for the receiver's transaction layer to robustly parse incoming TLP content without relying on TLP demarcation information from the Physical or Data Link Layers. As another example, extensibility of packets may be better facilitated via a flexible TLP structure consisting of a TLP Header Base followed by flexibly added additional header content (e.g., zero to 7 additional double words (DW) of content). In one example, the PCIe Transaction Digest may be replaced in flit mode packets by a "Trailer" of zero to 3 DW. In some implementations, the first DW of the Header Base includes all information requisite to determine the full size of the TLP, including the Header itself, any data payload, and the Trailer, if present. The End Bad (EDB) and Poisoned TLP mechanisms may also be modified, and in flit mode indicated via Suffixes which, if present, immediately follow the TLP to which they apply, and which, for Poisoned, are conveyed end-to-end with the TLP through Root Complexes that support peer-to-peer and all switches. Further, all TLP Type encodings defined for flit mode headers may be assigned flow control and routing for "forwards compatibility," such that new opcodes can be allocated without requiring modification to existing switch and the generic blocks of PCIe controller hardware.

Figure 5:
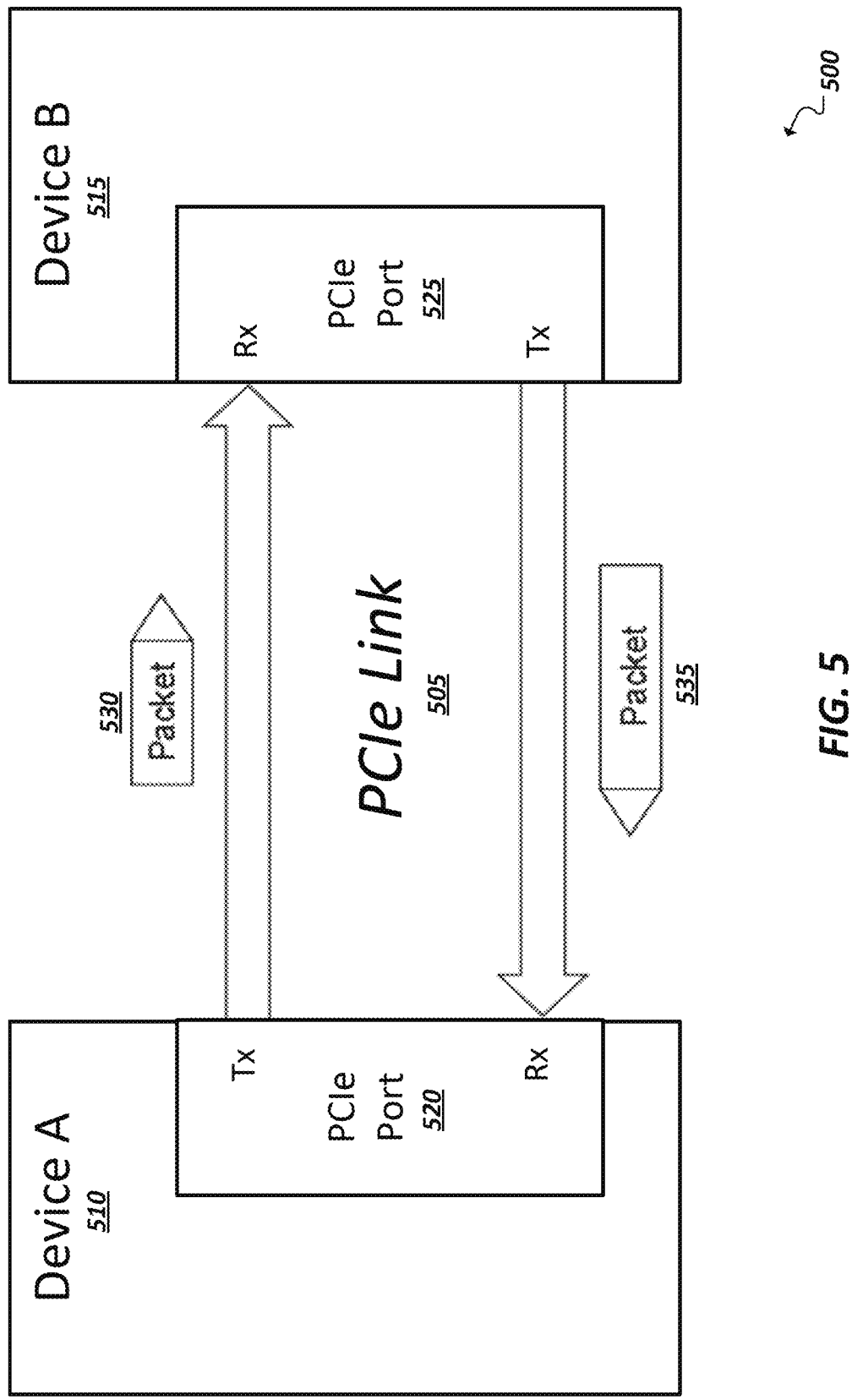
FIG. 5 illustrates a first device coupled to a second device by an example link.

Turning to FIG. 5, a simplified block diagram 500 is shown illustrating an example PCIe link 505 coupling a first device 510 to a second device 515. Each of the devices 510, 515 may be equipped with one or more multiple ports (e.g., 520, 525) to support one or more multiple connections to other devices (e.g., on the same or different die or package). The port (e.g., 520, 525) may include transmit and receive circuitry as well as logic (e.g., implemented in hardware circuitry) to implement one or more interconnect protocols governing operation of a corresponding connection. For instance, ports 520, 525 may each include circuitry to implement a layered protocol stack of a PCIe-based protocol. The PCIe protocol (e.g., PCIe 6.0) may support both a flit mode and another non-flit mode. The corresponding protocol circuitry (e.g., of ports 520, 525) may be utilized to generate packets (e.g., 530, 535) with packet headers according to each of the flit mode and non-flit mode, such as discussed in the examples herein. Likewise, protocol logic at the devices 510, 515 (e.g., corresponding to the receivers of the ports 520, 525) may receive packets (e.g., 530, 535) generated and sent by another device and utilize information within the packets to identify boundaries of the packet and parse the packet and its contents (e.g., using fields such as discussed in the examples below).

As introduced above, in flit mode, the link may be configured to robustly parse incoming TLP content without relying on TLP demarcation information from the Physical or Data Link Layers. In addition, flit mode PCIe TLP headers may include several changes over traditional PCIe TLP headers to improve extensibility compared to these non-FLIT mode header structures where all reserved bits are consumed. Indeed, in some cases, the lack of remaining space in traditional PCIe TLP headers may result in implementations where information is mixed between the header itself and TLP prefixes, among other example issues. In an example flit mode, link local TLP prefixes may be preserved, but end-to-end TLP prefixes are removed and replaced with a more flexible TLP structure consisting of a defined TLP header base optionally followed by 0-7 additional DW of header content. Further, in some implementations, the PCIe Transaction Digest mechanism is replaced by a "Trailer" of 0-3 DW. In one example, the first DW of the flit mode header base may be formatted to include all information requisite to determine the full size of the TLP, including the header itself, any data payload, and any trailer if present.

Additional features may be provided in an example flit mode TLP format. For instance, PCIe End Bad (EDB) and Poisoned TLP mechanisms may be modified in flit mode and indicated via suffixes which, if present, immediately follow the TLP to which they apply, and which, for Poisoned, are conveyed end-to-end with the TLP through root complexes that support peer-to-peer and all switches. In some cases, in flit mode, the transmitter is to finish an entire TLP transmission in the sense that it is to transmit something in each indicated position including payload and trailer and not attempt to end TLP transmission early. In such cases, the transmitter is to transmit "filler" content if needed to fill out the full TLP size indicated at the start of transmission (e.g., in fields of the TLP's header based on the transmitter running out of content to send) and then follow that transmission with an EDB suffix. In other cases, errors in a TLP may be indicated through an EDB suffix (or other fields), and corresponding receivers may discard without effect all TLPs with such EDB designations, among other example features.

Figure 6:
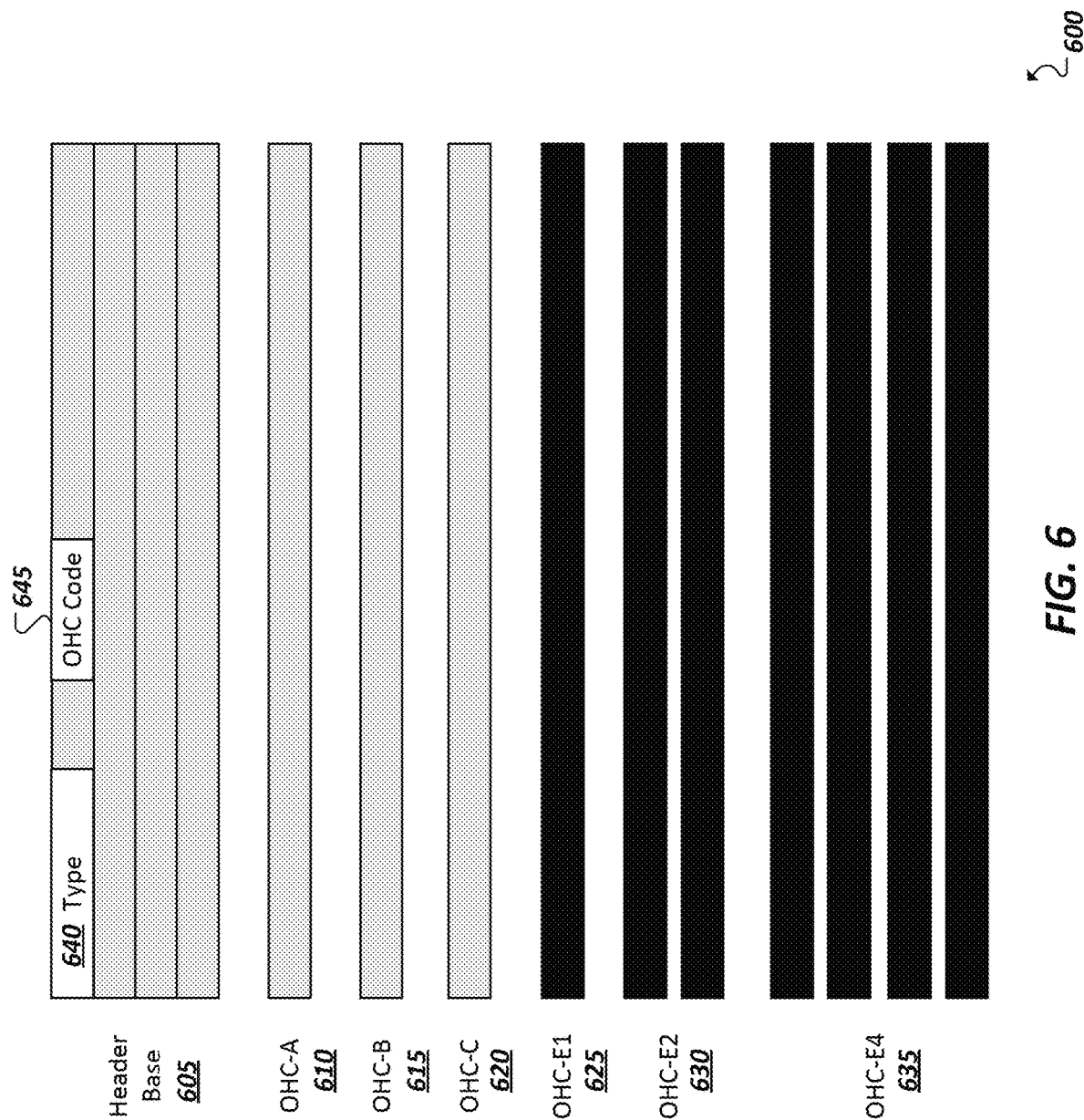
FIG. 6 illustrates an example packet format.

Turning to FIG. 6, a representation 600 is illustrated of an example flit-mode packet (e.g., TLP) format. For instance, the flit-mode packet format may include a header base 605 composed of a set of fields (e.g., 640, 645) that may be parsed by a receiver to determine an overall length of the packet, as well as other information, such as an identifier of the source of the packet, address information (e.g., for a destination of the packet), a transaction identifier, among other example information. The fields and format of the header base 605 may be based on and correspond to the type of packet. For instance, the headers of some packet types may have varying lengths (e.g., 3 DW or 4DW), combinations and types of fields, and other varying characteristics corresponding to the packet type. Some header fields may be present in headers of each packet type, such as a type field (e.g., 640) to indicate the packet type, among other examples.

In the example of FIG. 6, in addition to a header base, additional fields may be selective added to the header as header content blocks, or "orthogonal header content (OHC)". In one example, a set of header content blocks may be selectively appended to the header base 605 to form the complete header for a packet. For instance, one, more than one, or none of the header content blocks may be appended to the header base based on an encoding of an orthogonal header content (OHC) field (e.g., 645) in the header base 605. In some implementations, the OHC field may use one-hot encoding or another encoding technique to identify which (if any) of the header content blocks (e.g., 610, 615, 620, 625, 630, 635) are to be included in the header. Fields of the header and/or header content blocks may further identify the length of the remaining packet (e.g., the packet payload), the presence and character of suffixes, trailers, and/or prefixes included in the packet, among other packet components.

In some instances, the transaction layer packet grammar of a flit-mode packet may be defined to include zero or more 1DW of local TLP prefixes, a TLP header base (e.g., 3DW or 4DW based on the packet type), a TLP data payload (e.g., of 0 to 1024 DW), a TLP trailer (if present), 0 or more 1DW end-to-end suffixes, etc. Fields of the packet header (e.g., of the header base or one or more of the header content blocks) may identify length of the payload, the combination of header content blocks includes, the presence and character of prefixes, trailers, suffixes, and other information to allow a receiver to parse the header and determine the length of the header and the packet.

In one example implementation, one or more of the header content blocks (e.g., 610, 615, 620, 625, 630, 635) may have a variable length, the length of which may also be indicated in a field of the header base. For instance, two or more types of header content blocks (e.g., OHC-A (610), OHC-B (615), OHC-C (620), and OHC-E) may be defined. At least one of the header content block types (e.g., OHC-E) may have multiple possible lengths (e.g., 625, 630, 635). In one example, a 5-bit OHC field may be defined in the header base (e.g., in a first DW of the header base) to identify the header content blocks to be appended to the header base. In one example, encodings may be defined for the OHC field (e.g., OHC[4:0]) such as:

00000b=No OHC present
xxxx1b=OHC-A present
xxx1xb=OHC-B present
xx1xxb=OHC-C present
00xxxb=No OHC-Ex present 01xxxb=OHC-E1 present
10xxxb=OHC-E2 present
11xxxb=OHC-E4 present
where an indicates that either a 1 or a 0 may be present, and these encodings are not mutually exclusive.

It may be permitted for any combination of header content blocks to be present in the header (e.g. OHC-B and OHC-C present without OHC-A or OHC-E). In some implementations, when two or more header content blocks are designated to be included in the header, the header content blocks may be defined to be present within a defined order (e.g., header content blocks following the header base and then in OHC-A, OHC-B, OHC-C, OHC-E order). In some implementations, the contents of a header content block may vary depending on the TLP type (such as shown in the examples of FIGS. 7B, 8B, 9B, 10B, 11B, 12B).

In some implementations, when TLP Processing Hints (TPH) are used (e.g., in Memory Routed Request TLPs) an OHC-B header content block includes appropriate processing hint (PH), steering tag (ST), Address Translation Service (ATS) memory attribute (AMA), and AMA valid (AV) values, among other examples. In some implementations, unlike a non-FLIT mode header, a ST field in a flit-mode packet is not overlaid with byte enables or other fields. When OHC-B is included, if TPH is not being used the PH and ST fields may be encoded with all 0's.

In some cases, memory request packets that use byte enables to express the address/range of bytes to be read/written, and/or use a process address space identifier (PASID) may incorporate such fields through a particular header content block (e.g., OHC-A). As a corollary, memory requests that do not require the use of byte enables to express the address/range of bytes to be read/written, and do not require PASID, may omit the particular header content block (e.g., OHC-A). In some implementations, when such a particular header content block is When OHC-A is included with a TLP, if byte enables apply to the TLP type, then the values in the byte enable fields may be encoded to accurately indicate the enabled bytes. Further, if the PASID is not known or has not been assigned when the particular header content block (e.g., OHC-A) is included, then the PASID field value of the particular header content block may be all 0's.

Some types of packets or transactions may always involve the inclusion of one or more defined header content blocks. For instance, IO Requests and Configuration Requests may always utilize OHC-A blocks with byte enables in their packet headers. As another example, Message Requests may always include a particular header content block (e.g., OHC-B) with a Message Code[7:0] field, among other examples. For instance, Configuration Requests may always include a OHC-B block that includes a Destination Segment field. In such cases, a root complex indicates the correct segment value in Destination Segment field (e.g., even if only one Segment is implemented). The completer then captures the segment value indicated in Destination Segment, along with the Bus, Device, Function (BDF) value assigned, and returns this as its Completer Segment value when the Completer Segment is used (e.g., similarly to the way BDF is returned today (e.g., as a Segment, Bus, Device, Function (SBDF) value)). Accordingly, in some implementations, all Configuration Completions may also include a OHC-B block with both Requester Segment and Completer Segment fields. In some instances, if the captured segment number is non-zero, then all subsequent TLPs are to include the OHC-B block in their headers with the captured Requester/Completer Segment value. For a request, if the Requester Segment is non-zero, then all Completions for the Request are to include OHC-B with Requester Segment and Completer Segment values. The Destination Segment field may be held as reserved for TLPs other than Configuration Requests in some implementations.

In some cases, one or more header content blocks (e.g., OHC-C) may be provided and defined for use in facilitating data security, such as through fields to enable data integrity, data encryption, and other features (e.g., to support emerging integrity and data encryption features of PCIe). Accordingly, secure TLPs may include such header content blocks to facilitate the desired (or required) level of security or other enhancements, among other example header content blocks.

Lane margining or channel error characterization is extremely important for modern data centers. During internal validation or in customer test platforms, lane margining or channel error characterization can be used to characterize and tune the electrical parameters efficiently to ensure that data channels operate efficiently and with minimal errors. The biggest return on investment though is its application to mission mode deployment (or deployment of such monitoring on a computing platform within a live, operational "runtime" environment). Mission mode channel error characterization and diagnostics allows such monitoring to be deployed in data centers without disrupting regular traffic (e.g., rather than by pulling a server offline to remove components to be tested using a separate tester system (e.g., a bit error rate tester (BERT)). Mission mode monitoring enables the data center owner to monitor the electrical channels across several thousand platforms as well as calibrate the parameters using real world workloads and signals. This allows the actual data signals to be identified, which are the source of higher rates on one or more platforms within the system. These data signals may then be reused within testing environments or other environments to more particularly tune the platform (e.g., tune its equalization parameters) to reduce the error profile for the platform. Traditionally, performing such testing and diagnostics involved attempting to approximate signal activities using test platforms with artificial test pattern generation to recreate the live signaling (and error) conditions to enable proper diagnosis and tuning of the link. Such an approach is not only difficult and costly (both in terms of implementation and its disturbance to the system under test), but also suboptimal in terms of accuracy.

In an improved system, at-scale lane margining and error characterization may be performed on physical, point-to-point serial data links in data centers (and other systems) within mission mode (at runtime), as well as using internal test platforms. Such a solution may be employed to a variety of interconnect technologies, including defined or fixed length flow control units (or flits), such as PCIe (Generation 6 and above), Compute Express Link (CXL), UltraPath Interconnect (UPI), Gen-Z, and others. The hardware implementations presented here allow customers and internal validation teams to characterize the link errors without disrupting regular traffic flow. Further, user/application data is not compromised as logging is on encrypted data only, in some implementations, among other example advantages.

Previous attempts to perform lane margining include Logical Compare Engine (LCE)-based solutions. With LCE, artificially generated test patterns are injected while the link is running in loopback mode (e.g., rather than using live data signals in an active transmit (e.g., L0) link state), and received data is compared against sent data. Additionally, LCE-based solutions are not for use in mission mode and cannot be deployed at scale in a data center fleet. Further, native lane margining error screening provided in current and previous interconnects (e.g., PCIe, UPI, CXL, Gen-Z, etc.) lack comparable functionality. For instance, in PCIe lane margining counts errors at a coarse level and debuggability was limited without the use of a separate logic analyzer. Even such logic analyzer-based solutions lacked extensive error logging capabilities comparable with the solutions described herein.

In an improved computing platform, enhanced hardware circuitry of an interconnect port may be provided to implement an interconnect protocol stack and an improved hardware-implemented algorithm to log information at the port that can be post-processed for lane margining/channel error characterization and debug (e.g., by software). Additionally, this logging functionality may be activated through a logging mode of operation (e.g., separate from a full replay mode of operation), which may be utilized in mission mode operation of the platform. Mission mode support may extend to processor devices (e.g., CPUs) or devices deployed in a data center fleet. Accordingly, through the logging mode, it is possible to monitor and characterize the links in real world scenarios and at scale as the link is in its live operational mode carrying traffic load from typical user applications on a system deployed at the customer site during mission mode. Such an implementation may be implemented using minimal silicon area overhead with the hardware/software interface that can be standardized for runtime analysis in a fleet of server processors at scale, among other example advantages.

Figure 7:
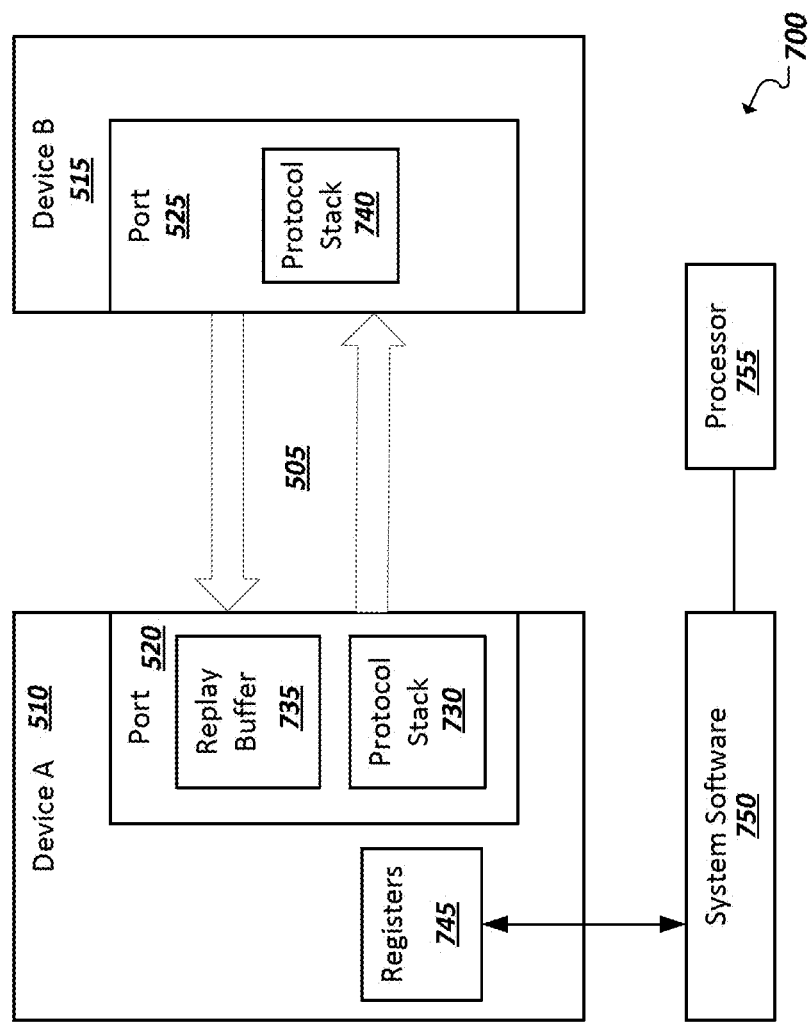
FIG. 7 is a simplified block diagram illustrating an example computing platform.

FIG. 7 is a simplified block diagram 700 illustrating an example computing platform (or portion of a computing platform, such as a portion of server blade, motherboard, system on chip, etc.) including a first device 510 and a second device 515 connected by a point-to-point serial link 505, such as a link compliant with a layered interconnect protocol that utilizes flits (e.g., PCIe, CXL, UPI, Gen-Z, etc.). A respective port (e.g., 520, 525) may facilitate the link 505 and communication of data (e.g., data link layer packets, transaction layer packets, flits, etc.) over the link in accordance with a layered protocol. In this example, a port (e.g., 520) may include protocol circuitry 730 to implement the protocol stack of the protocol(s) supported at the port 520. Additionally, in some implementations, a replay buffer 735 may be provided to facilitate replay of data on the link 505, such as a series of flits in which an error is detected. An error may be detected in one or more of the flits on the basis of an error correction code (ECC) included in one or more of the flits. In some implementations, the protocol circuitry 730 may additionally utilize forward error correction (FEC) (and associated FEC codes included in the data) to enable correctable errors to be corrected. In some implementations, a valid flit is one that passes the cyclic redundancy check (CRC) (e.g., based on a CRC included in and based on contents of the flit) after performing an FEC correction (if required), and none of the ECC groups in the FEC are reporting an uncorrectable error (by ECC), among other examples.

A replay buffer 735 may be defined to be used in a replay protocol or replay mode (also referred to herein as a standard mode) in accordance with the definitions of its corresponding protocol (e.g., the ACK/NAK-based handshaking protocol governing flit replays in PCIe 6.0). The hardware structure provided at a device (e.g., 510) to implement the replay buffer 735 (e.g., for the defined standard replay mode) may be leveraged and reused in a specialized logging mode, which may be entered into through an exit from the standard replay mode. For instance, a transition from the replay mode to a logging mode may involve disabling certain functions (e.g., of one or more layers of protocol circuitry 730) and draining all or a portion of the contents of the replay buffer 735 to make the replay buffer 735 available for logging selected copies of flits sent on the link 505 based on detected errors affecting these flits. The replay buffer 735 may be effectively filled with copies of flits serving as records of error events detected (e.g., by the protocol circuitry 730) on the link during the logging mode. A logging mode exit event may be further detected (e.g., based on an amount of time or unit intervals elapsing, a threshold number of errors being logged, a threshold percentage of the replay buffer's capacity being used, etc.) to trigger an emptying or copying of the contents of the logs (e.g., logged copies of certain, select flits) entered in the replay buffer 735 to a software-accessible register in a set of registers (e.g., 745) provided on the device 510 and corresponding to the port 520/link 505 (e.g., configuration registers, etc.). System software associated with (e.g., running on) the computing platform (e.g., executed by one or more processor devices (e.g., 735) on the platform) may access the log data in the registers 745 and perform processing on the log data to determine characteristics of the logged errors, perform lane margining, modify equalization parameters and algorithms, and otherwise determine underlying causes of the errors and/or improvements to the configuration of the affected link (e.g., 505), including one or more specific lanes of the link, to mitigate against future errors repeating on the link 505.

In some implementations, registers 745 may be utilized to report the incidence of errors on the link 505 outside of the logging mode (e.g., during a standard mode). Such error counting or reporting may be at a high, generic level, such that system software 750, protocol logic (e.g., 730), or other logic may identify a need for a recovery or other intervention. For instance, a threshold number or rate of bit errors (e.g., correctable and/or uncorrectable errors) may be defined (e.g., in another configuration register), such that when this threshold is met or surpassed, a transition to a logging mode is triggered. In some implementations, a logging mode may limit or disable certain functionality of the link (e.g., selective replay), which may be temporarily disadvantageous to the operation of the platform. Accordingly, logging mode may be only selectively applied, for instance, on links where a relatively high number or incidence of errors is detected. Links suffering from a lower error rate may be allowed to function (e.g., and rely upon more standard error detection/correction techniques (e.g., FEC, replay, etc.) in a standard mode, rather than in the specialized logging mode). When a logging mode concludes, the protocol circuitry 730 (e.g., at the direction of system software 750) may exit the logging mode to return to the standard mode, among other example implementations.

Figure 8:
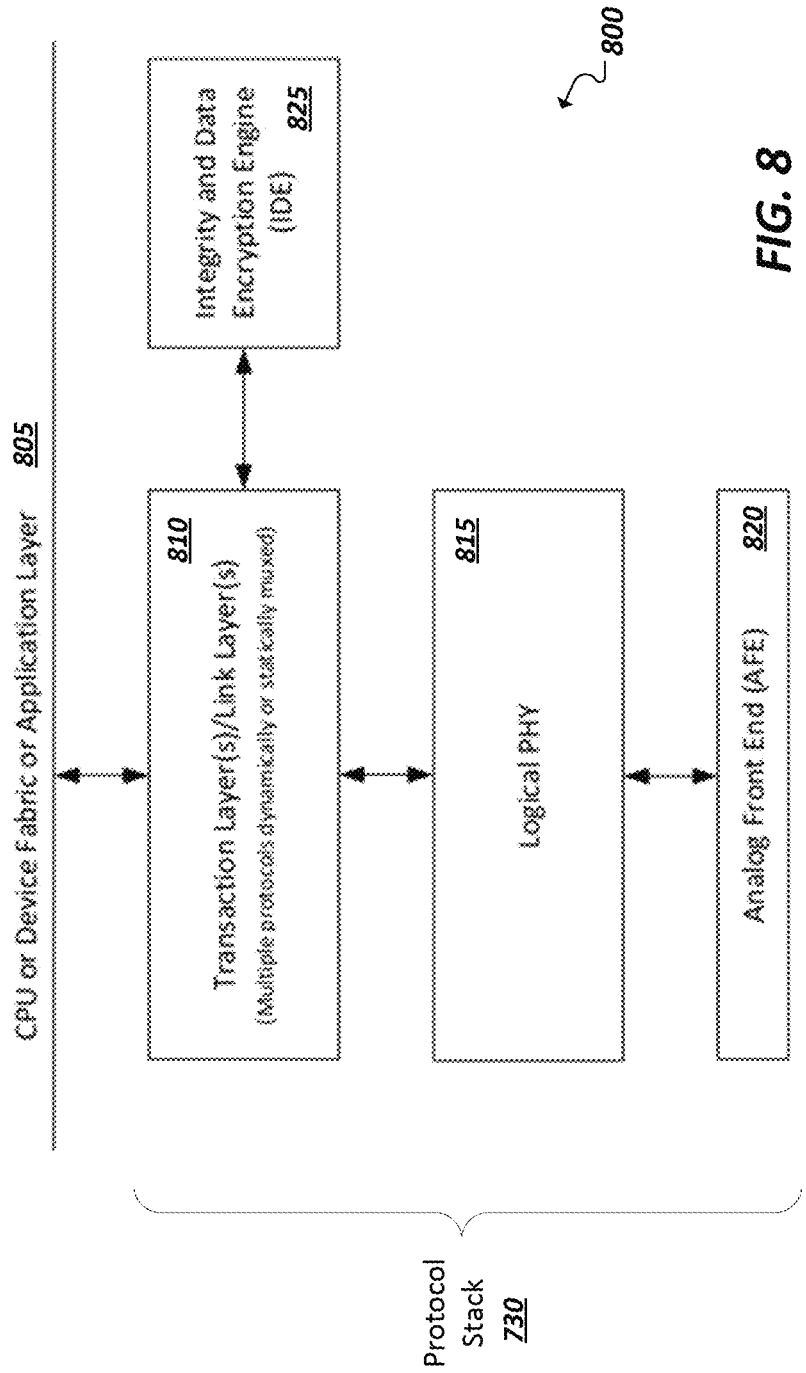
FIG. 8 is a simplified block diagram illustrating an example protocol stack.

Turning to FIG. 8, a simplified block diagram 800 is shown illustrating a high-level concept of an example universal I/O stack. In some implementations, multiple protocols (e.g., PCIe, CXL, UPI, etc.) are dynamically or statically multiplexed onto the same logical physical layer (e.g., logical PHY 815) and serializer/deserializer (SERDES) circuitry. In some implementations, error detection (e.g., forward error correction (FEC), cyclic redundancy check (CRC), etc.) as well as the retry buffer may be implemented as part of the logical physical layer 815. When link-to-link encryption is enabled, the encryption protection may be implemented above the logical PHY, for instance, at the transaction layer (e.g., at the transaction layer packet (TLP)) or data link layer level (e.g., 810). For instance, an integrity and date encryption engine (IDE) 825 may be provided to encrypt data that is delivered to the protocol stack 730 from the CPU, device fabric, and/or application layer (e.g., 805) above the top layer (e.g., 810) of the protocol stack 730. In such examples, when encryption is enabled, all the data is encrypted prior to be sent to the logical PHY 820 and onward onto the link (via the analog front end (AFE) 820 of the port). Accordingly, in implementations of a logging mode utilizing a replay buffer at the PHY (e.g., 815), the logged flits remain encrypted as copies are made prior to their decryption by IDE 825 thereby preserving the security and privacy of the application layer data, among other example implementations.

Figure 9B:
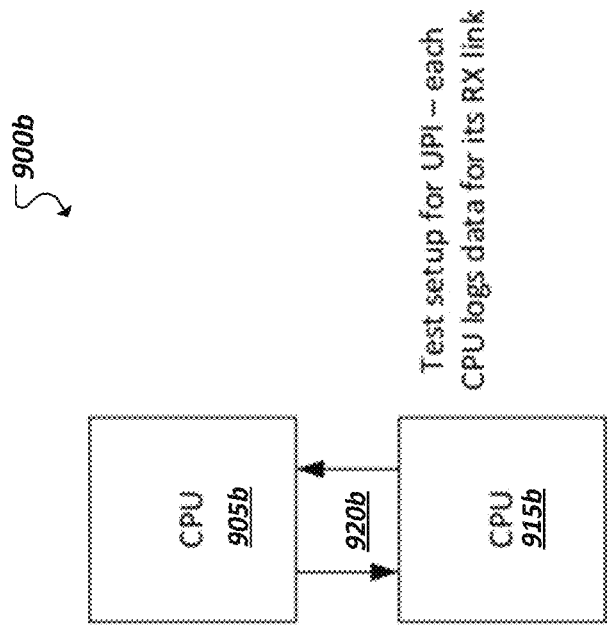
FIGS. 9A-9D illustrate example link configurations utilizing an example logging mode.
Figure 9A:
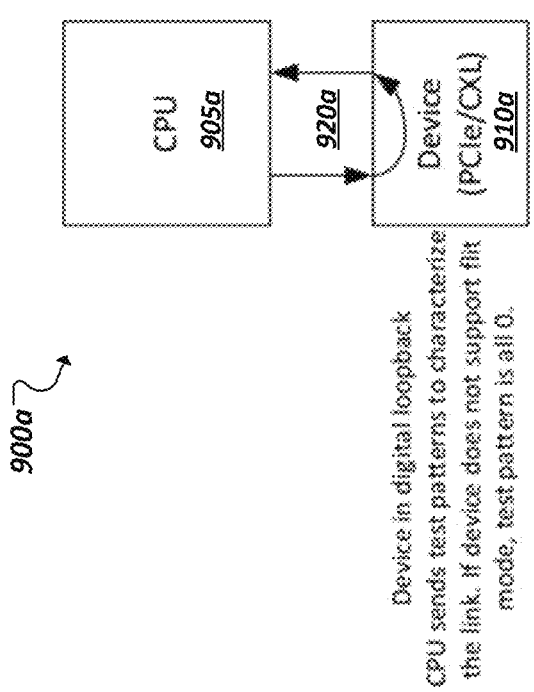

Turning to FIGS. 9A-9D, simplified block diagrams 900*a-d* are shown of example topologies in implementations of a logging mode utilizing a replay buffer at a port. FIGS. 9A-9B show example implementations in a test mode. In an example test mode, test pattern generation logic may be provided in the platform (e.g., as additional specialized hardware of a host or processor device connected by the link). This test pattern generation logic may inject artificial test patterns (e.g., at the direction of software) in a debug or test mode entered into by the devices (e.g., 905*a* and 910*a* or 905*b* and 915*b*) on the link (e.g., 920*a*, 920*b*). In a first configurations, a processor device 905*a* may be coupled to another device 910*a* (e.g., a PCIe or CXL device). In this example, only processor device 905*a* possess test pattern generation hardware and can generate test patterns, for instance, in a loopback link state to facilitate a test mode for this example platform. An example logging mode may be enabled during the test mode. The processor device 905*a* sends test patterns in an attempt to characterize the link, with the other device 910*a* looping-back the test pattern to the processor device 905*a* on the link. The processor device may log looped-back flits from the other device, which are detected to have an error, in the replay buffer of the processor device 905*a*, among other example implementations. In some test mode implementations, even older generation PCIe devices (e.g., that do not support flit mode) may be utilized, for instance, by putting the legacy device in the loopback dependent position (e.g., similar to device 910*a*) and sending only IDLE flits (e.g., all 0 data) which have been scrambled to still ensure different bit patterns are exercised, among other examples. In FIG. 9B, two processor devices (e.g., 905, 915*b*), or other devices both equipped with test pattern generation hardware, may be coupled together by a link 920*b* and may each send respective test patterns and log received error-affected flits in their respective replay buffers for later analysis by post-processing software programs.

Figure 9D:
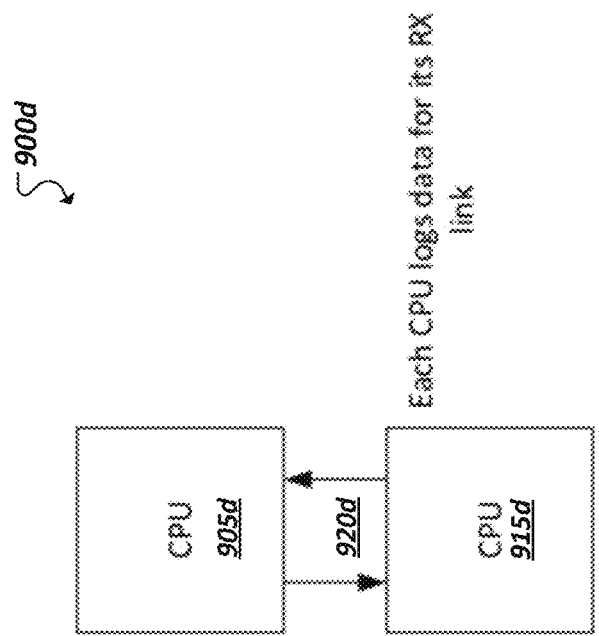
Figure 9C:
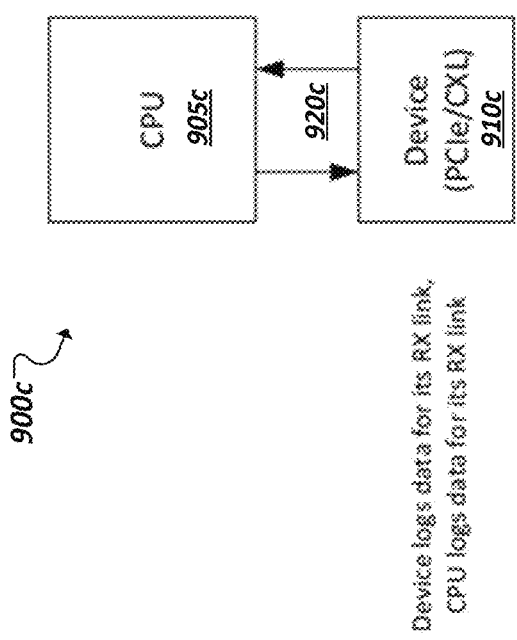

FIGS. 9C-9D show example implementations in a mission mode. In mission mode, a logging mode is enabled and logs copies of flits sent during live or runtime traffic on a link (e.g., 920*c*, 920*d*) based on errors detected involving these flits. Accordingly, the logging mode and associated functionality and advantages may be implemented on platforms, where one or more of the link partners (e.g., 905*c* and 910*c* or 905*d* and 915*d*) do not support test signal generation or a test mode. Further, a wider variety of "real" or live signal patterns may be captured and analyzed (rather than those based on the artificial test patterns generated in a test mode) to allow copies of flits to be logged and analyzed that represent the true data patterns occurring in live, deployed platforms that are the source of error activity on corresponding links (e.g., 920*c*, 920*d*), among other example implementations and configurations. In instances where the flits are sent scrambled on the link, a record of the scrambling algorithm (e.g., LFSR) may also be obtained to allow software, during analysis, to effectively recreate the scrambled versions of the logged flits to assess the signals as they were sent, scrambled, on the link.

Figure 10:
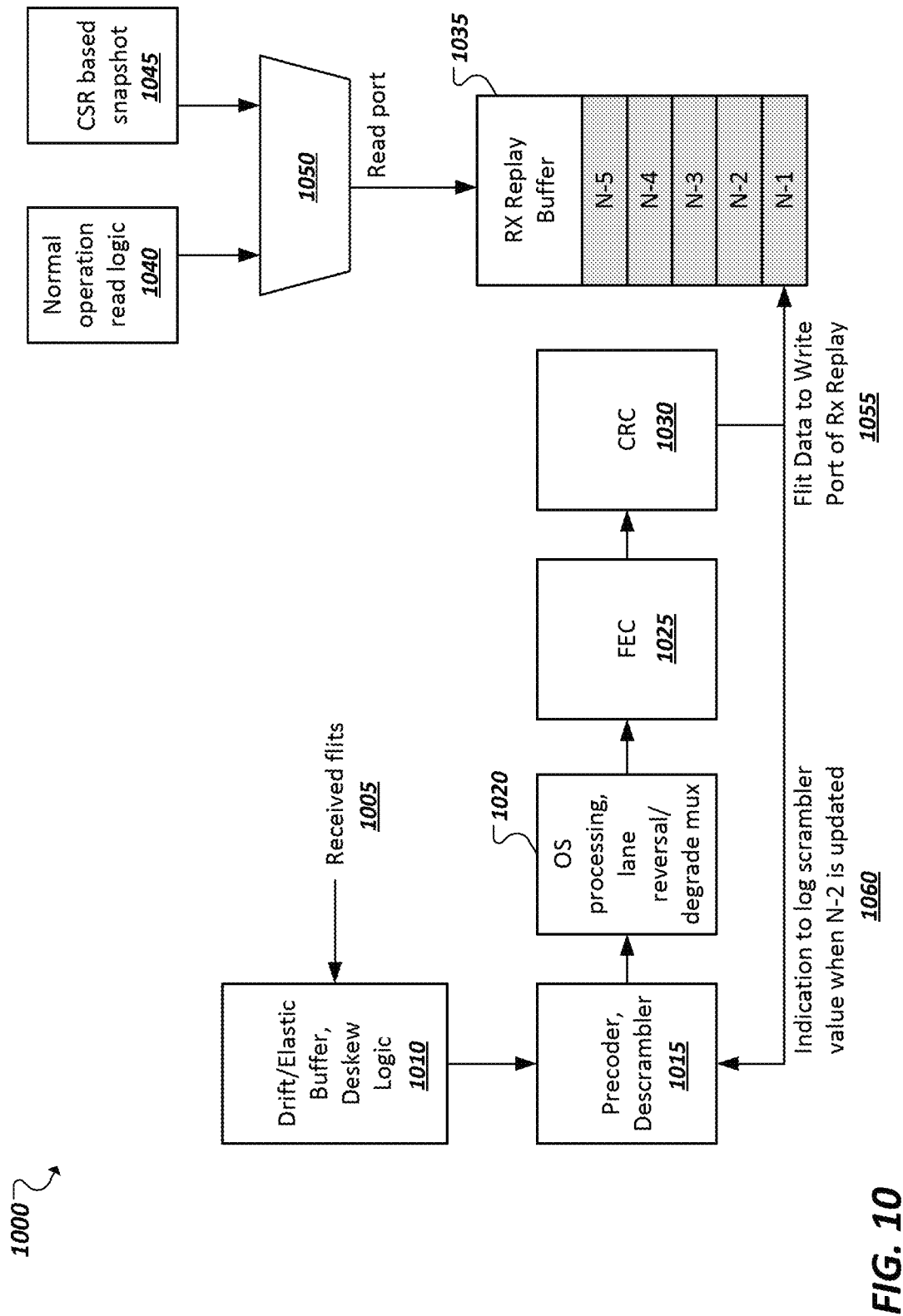
FIG. 10 is a simplified block diagram illustrating example logic for implementing an example logging mode using a replay buffer.

FIG. 10 is a simplified block diagram 1000 showing example logic implemented in PHY circuitry to support error detection, correction, and logging in an example device port supporting the logging mode discussed herein. For instance, flits 1005 may be received by a drift or elastic buffer 1010, including deskew logic and then passed to precoding descrambling circuitry 1015. OS processing, lane reversal, degrade multiplexing and other functions may be performed on the descrambled flits (at 1020) and passed to error detection logic including, for instance, forward error correct (FEC) logic 1025 and/or CRC logic 1030. In the case of FEC logic, an error may be both detected and (when correctable) corrected. Error correction logic (e.g., 1025, 1030), collectively, may be utilized to identify specific flits in which an error (e.g., a bit error) has occurred. When the PHY is in normal operating mode, it may utilize its receive (RX) replay buffer to log a series of all valid flits received from its link partner the link to enable, for instance, replay flits (e.g., by buffering valid flits that are waiting for a replay of one or more preceding flits to be received before pushing the flit sequences to the upper layers). In some implementations, the replay buffer 1035, when in normal operation mode (e.g., 1040), can enable selective replay, where only specific flits are replayed (rather than a larger number or series of flits) in response to detection of an error in the specific flit and a corresponding selective replay request to the link partner, among other example replay functionality.

In devices supporting an example logging mode utilizing its replay buffer (e.g., 1035), the port may multiplex or switch (e.g., at MUX 1050) the replay buffer between normal operation and logging mode. To transition to the logging mode, all or a portion of the flits buffered in normal operation (to support normal replay operation) may be drained to free up the replay buffer for logging of flits in the logging mode. In some implementations, during normal operation, a configuration or control status register associated with the port (and its link) may be maintained and fields of the register may be utilized to track errors as they occur on the link. When a (configurable) threshold number or rate of errors has been exceeded, for instance based on software reading the error information tracked in the register(s) (e.g., configuration register (CSR) snapshot 1045), software may trigger entry into the logging mode to assist in logging and analyzing error behavior of one or more lanes of the link.

In some implementations, when in logging mode, the replay buffer may be utilized to log not only a copy of the flit, in which the error was detected, but also at least one of the flits immediately preceding or the flit immediately following the flit in which the error was detected. This may be configured, for instance, to account for error conditions at the boundaries (e.g., the beginning or end) of the flits. Further, a copy of the corrected (e.g., via FEC) or valid (e.g., replayed) version of the flit with the error may be logged in the replay buffer 1035, among other copies of other example flits that are assumed to be of use in assessing this error. In some implementations, specific (e.g., relative) positions within the replay buffer 1035 may be assigned for the copies of flits pertaining to a single error found in a particular flit. For instance, pointers (e.g., N-5, N-4, N-3, N-2, N-1, etc.) may be utilized to group or otherwise logically associate the flit copies logged in the replay buffer during logging mode to identify these flit copies as pertaining (in their own respective way) to a detected error in a flit (whose copy is also included in this logical grouping).

In one example implementation, the error logging hardware logic may be configured to log copies of between three to five flits related to the error observed. An RX replay buffer defined in the PCIe specification may be temporarily repurposed for this logging mode. When this mode is turned on, some functionality of the normal replay buffer operation (e.g., selective replay) may be disabled and at least a portion of the entries of the replay buffer 1035 repurposed for logging the flits. In some implementations, when logging mode is enabled, the other logical PHY circuitry and functionality may be programmed to behave differently in support of the logging mode, such as by not triggering recovery due to excessive CRC errors (e.g., if in test mode, as during test mode the electrical parameters are being changed on the fly and recovery would be undesired). In mission mode, the logging mode transforms the circuitry into more of a monitoring level role to see how well the parameters are performing in real world workloads and if the parameters need minor tweaks, among other examples.

As noted above, in some implementations, two types of error can trigger logging in a logging mode: a corrected error (e.g., where FEC 1025 detects a single error and CRC passes post FEC) and an uncorrected error (e.g., FEC may or may not detect error and CRC fails post FEC). In one example, for corrected errors, hardware logs the flit immediately preceding the erroneous flit before the error in a first position within a block of entries in the replay buffer 1035 used to log flits associated with the error. For instance, the flit (e.g., a valid flit) immediately preceding the erroneous flit may be logged in position (N-5), the erroneous flit with the error may be logged in position (N-4), a post-FEC corrected version of the erroneous flit may be logged in position (N-3), and the flit received immediately after the erroneous flit may be logged in position (N-2). In one example, where two successive flits are erroneous (e.g., the flit logged at (N-2)), the corresponding corrected version (from FEC) of the second flit (logged in position (N-2)) may be logged in (N-1). In such an implementation, where an entry (e.g., (N-1)) is dedicated to logging a corrected version of the succeeding flit (logged at (N-2), when this succeeding flit has an error, to maintain the relational nature of the entries (e.g., to reserve five entries for every flit error), this entry (N-1) may simply log another copy of the succeeding flit (logged at (N-2) in instances where this succeeding flit did not have an error (e.g., with the entries (N-2) and (N-1) being interpreted to indicate an error in the succeeding flit when the entries (N-2) and (N-1) do not match, and indicating a valid flit when the entries (N-2) and (N-1) match), among other examples. In some implementations, the logging mode may forego logging of corrected copies of flit affected by an error. For instance, the test mode where the test pattern is only IDLE flits, the corrected flit does not need to be logged, since its intended value is already known as it is based on an expected or predictable (although, in this example, the LFSR value would still be logged so that software can figure out the scrambled values), among other examples.

In some implementations, a logging mode may log correctable and uncorrectable errors differently. For instance, for uncorrectable errors, the hardware logs the flit received immediately before the error, for instance, at position (N-5), the flit with the error at position (N-4), and a copy of the corrected flit (post replay) at position (N-3). As in the previous example for correctable errors, in some implementations, for uncorrectable errors, the flit after the erroneous flit may be logged (e.g., at position (N-2)) and an additional entry (e.g., N-1) may be provided to log a copy of a corrected or replayed version of the succeeding flit in the event it also had an error (and merely logging a second copy of the succeeding flit in (N-1) if the succeeding flit did not have an error).

In the example of FIG. 10, the copies of flits written to the replay buffer (e.g., at 1055) are copies of the flits after they have been descrambled. In some implementations, the error characterization logic may also log (e.g., in a configuration register for the link and/or another entry of the replay buffer 1035) the value (e.g., pseudorandom generator seed) used by the scrambler (e.g., a linear-feedback shift register (LFSR) seed value). For instance, the LFSR value may be logged (at 1060) for one lane at the time the erroneous flit (e.g., logged at (N-4)) is detected. In some examples, descrambling 1015 is done post de-skew logic 1010, and so it is expected to have a fixed pipeline latency from the time of descrambling to the point where the error happens. In cases where descrambling is before the deskew logic and dynamic deskew is supported, implementations may be configured with logic to support deterministic logging of LFSR value so that software can reverse engineer which LFSR values were used for the flits logged. This also allows post-processing to backtrack the LFSR and figure out the precise value that was used to descramble the flit. This can then be used to reverse engineer the scrambled values of the logged flits.

After a logging mode is allowed to run and log a number of collections of flit copies corresponding to a number of detected flit errors, software may direct an end to or exit from the logging mode. For instance, the logging mode may conclude when the portion of the replay buffer dedicated to the logging mode is detected to be full, after a period of time (or number of unit intervals), or based on some other condition. To exit the logging mode, the physical layer may cause the contents of the replay buffer used to log errors in the logging mode session to be written to a register, such as a configuration or status register, to be accessed and read by software. For instance, using copies of the erroneous flit and a corrected version of this flit (as well as copies of flits immediately preceding or following the erroneous flit), software-implemented post processing scripts may process and analyze these flit copies to determine the exact bits in error. Further, the flit before and after the error can be used to determine the specific bit patterns preceding and following the error, which can then be used for further analysis and adjustments to the processes and settings used to set up (e.g., equalize) the link.

As discussed above, in some implementations, various configuration registers (e.g., a set of one or more registers provided for the link) may be provided and utilized to trigger entry into and exit from the logging mode, and to pass logged flit copies to the software from the replay buffer. In some implementations, the PHY may pass copies of the logged flits to the software-accessible registers on an ongoing basis during the logging mode (e.g., rather than waiting for the logging mode to conclude). In such instances, software may read and begin assessing flit copies logged in the replay buffer during logging mode, while the PHY logic continues to detect errors and log additional flit copies in the replay buffer. For instance, two or more sets of flits may be logged, so that hardware can continue logging flits with errors while software is taking snapshots and reading the logged flits from the previous error (e.g., as the speed at which the software accesses and reads the registers is relatively slow compared to the logging functionality of the PHY hardware, it may be preferable to log the subsequent errors while software is still processing the previous one), among other example features and implementations. The size of each entry in the replay buffer may correspond to the flit size as defined by the corresponding interconnect protocol of the link. For instance, 256B entries may be provided in an example replay buffer to correspond to a 256B flit size defined in a PCIe 6-based protocol, among other example protocols, flit sizes and buffer entry sizes.

As introduced in the example of FIG. 10, in some implementations, five flits worth of space may be reserved for each detected error in a replay buffer during logging mode. Multiples of this space may be reserved within the replay buffer to enable a corresponding number of sets of flits corresponding to a corresponding number of errors to be logged in the replay buffer during a logging mode session. For instance, as flits come in, if they pass FEC and CRC, they may be continuously written into a first position (N-5) of the set of replay buffer entries designated for logging the next set of flits for a next error. As newer flits pass FEC and CRC, these newer flits overwrite older flits in this position until an erroneous flit (e.g., a non-NOP flit with error) is detected. For instance, FIGS. 11A-11F illustrate an example logging of flits in a set of reserved entries (e.g., (N-5) through (N-1)) in an example RX replay buffer.

Figure 11C:
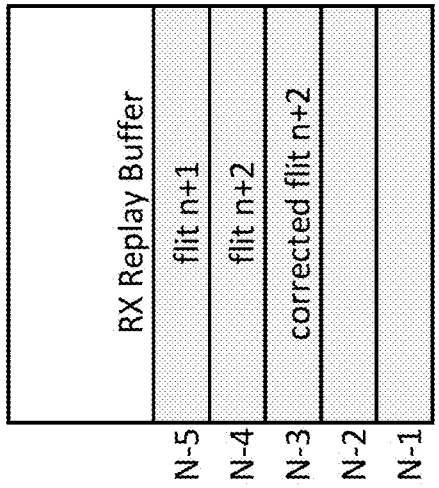

As shown in the representation 1100a of replay buffer entries shown in FIG. 11A, a set of entries (N-5) through (N-1)) may be designated for logging copies of flits associated with a next error detected during the enabled logging mode. In this example, a flit n is received, which is determined to be "good," or valid, in that it passes both an FEC and CRC check at the PHY logic of the port. Accordingly, flit n is logged in position N-5 of the replay buffer. The next received flit, n+1, may then be received and also be determined to be good. As a result, and shown in the representation 1100b of FIG. 11B, this next good flit n+1 replaces flit n in position N-5 of the replay buffer. This may continue for a prolonged series of good flits, with each new good flit replacing the last in position of N-5 of the replay buffer until an error is detected. In this simplified example, a next flit n+2 may be determined to be erroneous, or "bad," based on it failing an FEC and/or CRC check (or some other error detection check by the logical PHY of the port). The detection of this error acts to "freeze" the logging of the last, preceding good flit (e.g., flit n+1 in this example) in position (N-5). Further, as shown in representation 1100c of FIG. 11C, a copy of the erroneous flit n+2 is logged in position (N-4).

Figure 11D:
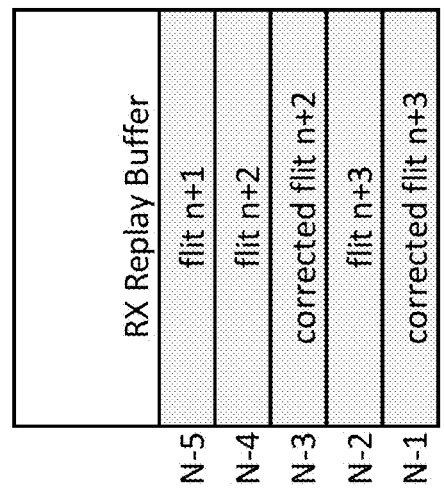
Figure 11E:
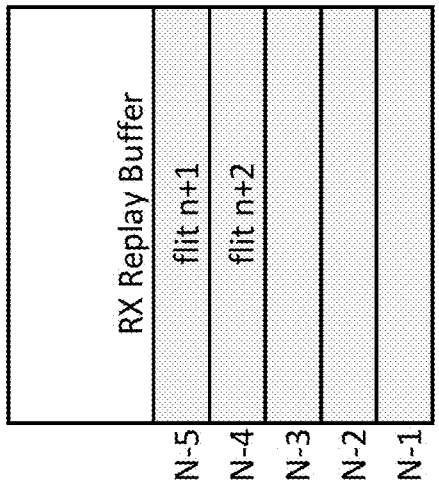
Figure 11F:
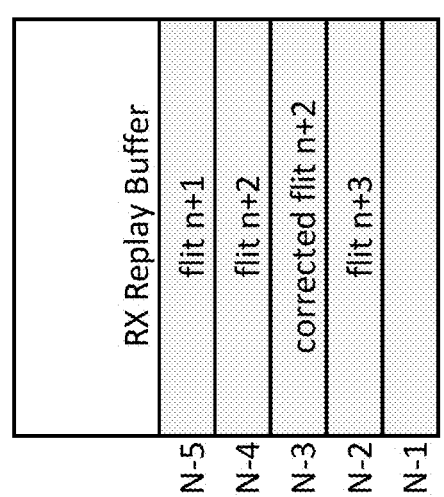

As noted in some of the examples above, in some implementations, in addition to logging a copy of an erroneous flit during a logging mode, a corrected or replayed (or otherwise "good") version of the erroneous flit may also be logged in the replay buffer, such as in position (N-3), as shown in the representation 1100d of FIG. 11D. This corrected or replayed copy (e.g., 1105) may serve to indicate what the contents of erroneous flit should have been had it not included an error. Additionally, in some implementations, a copy of the next flit (e.g., flit n+3) received after the erroneous flit (e.g., flit n+2) may also be logged in connection with the detected error (in flit n+2). For instance, as shown in the representation 1100e of FIG. 11E, a copy of the next flit, flit n+3, is logged in position N-2 of the replay buffer. Additionally, another entry in the replay buffer, (N-1), may be provided to log either an additional copy of this subsequent flit (e.g., flit n+3) if the flit is good, or logging a corrected copy (e.g., 1110) if this subsequent flit is also erroneous (or bad), as shown in the representation 1100f of FIG. 11F. In some implementations, when all of the entries reserved for a particular error have been filled during a logging mode, the logical PHY may indicate the completed error log or simply write the completed error log (e.g., entries (N-5) through (N-1)) in a register for use by software. For instance, a register may be utilized to notify software that one or more sets of replay buffer entries have been filled with logged copies of flits corresponding to detected errors to notify the software that is may also read out corresponding register data (written by the logical PHY to share these logged entries) for use in its analysis of the link.

TABLE 1 and TABLE 2 below illustrate examples of configuration registers, which may be used in some implementations to control a logging mode and for facilitating the sharing of logged flit data corresponding to errors detected in the logging with software. For instance, TABLE 1 illustrates an example register that may be used by software to trigger and control the entry into and exit from a logging mode, as well as monitor the progress of the logging mode. As this register is only an example, it should be appreciated that fewer fields, additional fields, and different fields may be utilized in practice to influence the configurability and usability of the logging mode.

TABLE 1

Example Logging Mode Control Register

| Register | Field (Attribute) | Description |
| --- | --- | --- |
| | [0] Enable (RW-V ((Read-Write by software, and autonomously updatable by the hardware))) | This bit indicates whether the logging mode is supported and enabled for use and triggering by software. |
| | [1] Trigger ("Read-Write" (RW)) | Software writes to this bit to trigger the logging mechanism. It only takes effect if Enable = 1. A 0→1 edge or a 1→0 edge triggers the logging mechanism. |
| | [4:2] Count (RW) | Software writes to this bit to indicate how many errors hardware should process. Number of flit stored will be 5*Count (e.g., 5 entries per "counted" error (although other implementations may utilize different numbers of flit entries, and the numbed of flit entries may also be a register-configurable value/characteristic). |

TABLE 1-continued

Example Logging Mode Control Register

| Register | Field (Attribute) | Description |
|---|---|---|
| | [7:5] StatusCount (RW-V) | Hardware increments this once it is finished logging the flits associated with an error. Software must set it to 0 before initiating a new trigger. Hardware stops logging any new flits when StatusCount == Count. |
| | [8] IdleFlit (RW) | Software writes a 1 to this to tell hardware it is working with IDLE flits as the pattern (e.g., in a test mode). |
| | [9] CorrectableErrorLog (RW) | Log flits when FEC corrects the error. |
| | [10] UncorrectableErrorLog (RW) | Log flits when FEC does not correct errors (i.e. CRC fails post FEC). |
| LFSRValue | [23-1:0] Data (RW) | 23 bits of LFSR value logged for the corresponding error count. |

Figure 12:
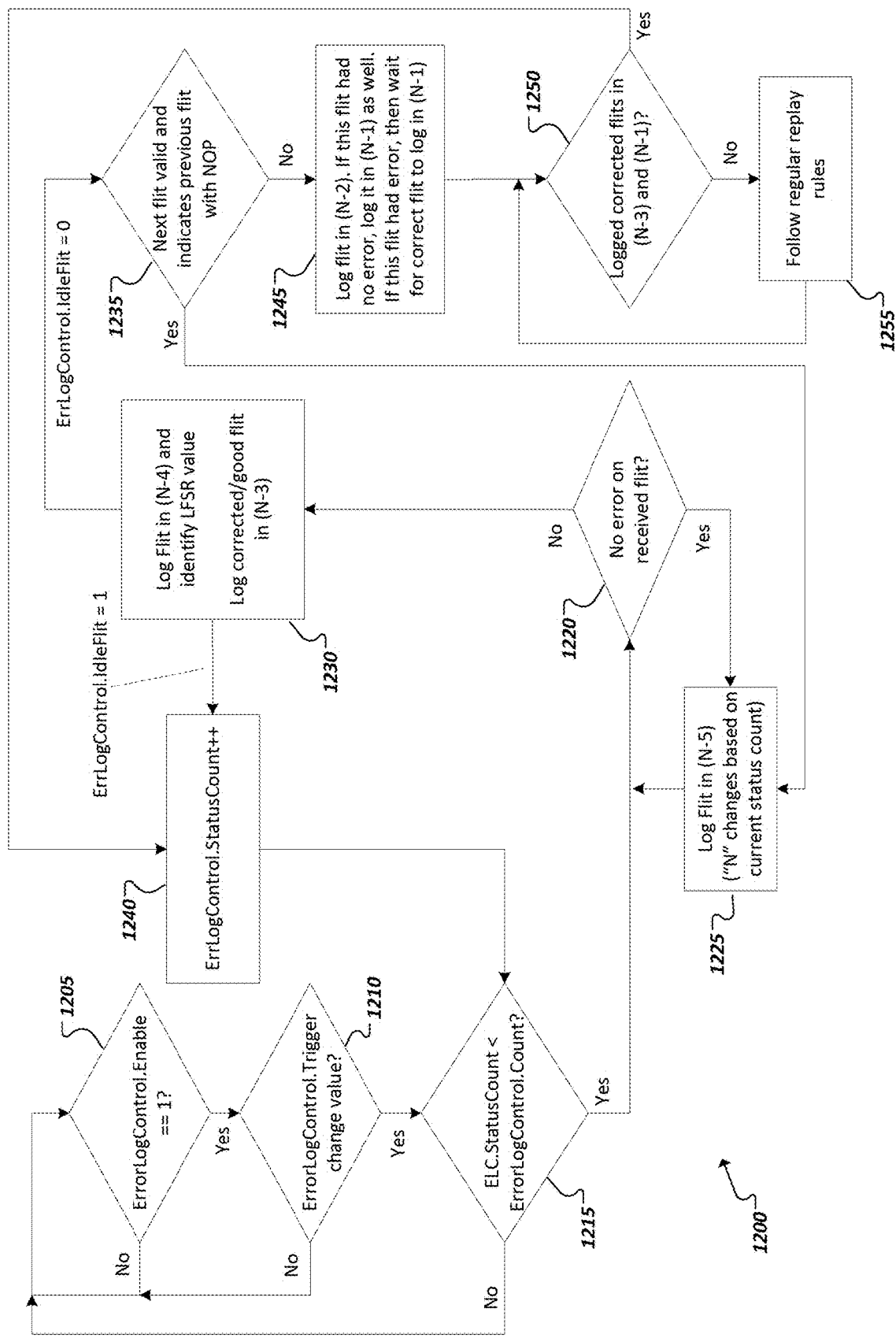
FIG. 12 is a flowchart illustrating an example technique for utilizing a register to control an example logging mode.

FIG. 12 is a flow diagram 1200 illustrating an example technique for managing an example logging mode, referencing the example register show in TABLE 1. For instance, software may enable the use of a logging mode by writing a "1" to ErrorLogControl.Enable (at 1205). When software determines that a link should transition from using a replay buffer in a normal operation mode, it may set a corresponding ErrorLogControl.Trigger value (at 1210). In this example, software may instruct the logical PHY (e.g., through values ErrorLogControl.StatusCount and ErrorLogControl.Count) how long the logging mode should progress, for instance, by setting a number of error events (and corresponding sets of log entries) the logical PHY should log before exiting the logging mode. For instance, when the number of errors counter exceeds a software-defined threshold (e.g., at 1215), the logging mode may end.

Continuing with the example of FIG. 12, when logging mode is activated, flits are received and checked for errors (at 1220). When no error is found in a flit, a copy of the flit is added (at 1225) to a first position in the replay buffer log (e.g., entry (N-5)), with each successive error-free flit replacing the previous error-free flit in this position. When an erroneous flit is detected a copy of this erroneous flit (e.g., before it has gone through and potentially been corrected by the FEC hardware) is logged in another entry (e.g., (N-4)) set aside for this error and a copy of its corrected/replay version is logged in another corresponding entry (e.g., (N-3)).

Continuing with the example of FIG. 12, in some implementations, special no-operation (NOP) flits may be supported. Such flits may possess no "real" data in them and entail fixed sequence number of 0 and not go through replay buffers on the link (e.g., the TX replay buffer). Given the possibility of NOP flits, a replay flit may not necessarily match an originally received flit. In some implementations, the presence of NOP flits may be identified (e.g., at 1235) and may result in an associated error logging event being dismissed for errors involving NOP flits. If the error was in a flit other than a NOP flit (at 1245), error logging may continue with the subsequent flit being logged as well (e.g., in position (N-2)) as well as an additional copy (e.g., in position (N-1)) to indicate whether this subsequent flit also had an error. This may be accomplished by logging the same copy of the subsequent flit in both the (N-2) and (N-1) positions if there was no error in the subsequent flit, or logging the copy of the subsequent flit in (N-2) and its corrected/replay version in (N-1) if the subsequent flit contained an error. In instances where back-to-back flits are determined (at 1250, 1255) have errors (e.g., the (N-4) and (N-2) flits), the port may be forced to wait for a replay of two flits before proceeding (e.g., to allow copies of the both replayed flits to be logged). The successful logging of flits in the replay buffer in connection with this detected error can also cause the ErrorLogControl.StatusCount value to be incremented (at 1240) by one in the case of a single erroneous flit (e.g., at (N-4)), or two in the case of back-to-back erroneous flits (e.g., at (N-4) and (N-2)). This process may continue until the ErrorLogControl.StatusCount value exceeds the ErrorLogControl.Count value, which serves to cause the logical PHY to automatically exit the logging mode (e.g., by draining the allocated portion of the replay buffer for reuse in normal operation mode, among other example steps).

TABLE 2 illustrates an example register for use by a logical PHY implementing a logging mode to transfer logged flit copies corresponding to an error from the replay buffer to software-accessible memory. Software may read the logged flit copies from the register for use in post-processing relating to improving or trouble-shooting characteristics and configurations of the link, which may be responsible for these errors.

TABLE 2

Example Logging Mode Snapshot Register

| Register | Field (Attribute) | Description |
|---|---|---|
| SnapshotControl | [0] Trigger (RW) | Software writes to this bit to trigger a snapshot of the logged replay buffer entries to be written to this register. A 0→1 edge or a 1→0 edge triggers read enable of the RF at the next available opportunity. |

TABLE 2-continued

Example Logging Mode Snapshot Register

| Register | Field (Attribute) | Description |
| --- | --- | --- |
| | [N:1] ReadPointer (RW) | RX Replay Buffer ("RRB") read pointer → goes to the read address of RRB or storage. |
| | [N + 8: N + 1] ChunkPointer (RW) | Offset within the data read from the RRB. 64 bits (e.g., of the entire 256 byte flit) are read at a time, so it is 8-byte offset. |
| | [N + 9] Busy (RO-V (Read-Only by software, but autonomously updatable by the hardware)) | Hardware loads a 1 into this bit as soon as Trigger toggles. Hardware loads a 0 into this once SnapshotData has updated values. |
| SnapshotData | [63:0] Data (RW) | 64-bit Data from the storage. This field is RW so that software can change it to make sure hardware did indeed update it. |

In one example, a snapshot register, such as illustrated in the example of TABLE 2, can be utilized to enable copies of flits logged during a logging mode from a RX replay buffer to be read by system software. For instance, a read/modify/write may be performed on the Trigger, ReadPointer, and ChunkPointer fields to prepare the register for use in a session of the logging mode. The software can poll on Busy bit until it set to 0 (e.g., by the corresponding port hardware). When the hardware (e.g., the logical PHY circuitry) releases it "1" Busy value, software may begin reading from the register (e.g., from the SnapshotData field), either opportunistically, according to a particular rate or schedule, or based on other values in a register being set to indicate that log data has been written to the snapshot register. In this example, upon successfully reading the log data from the register, software may then read additional log data by progressing to the next chunk/read pointer, as designated by the snapshot register, among other example implementations.

Figure 13:
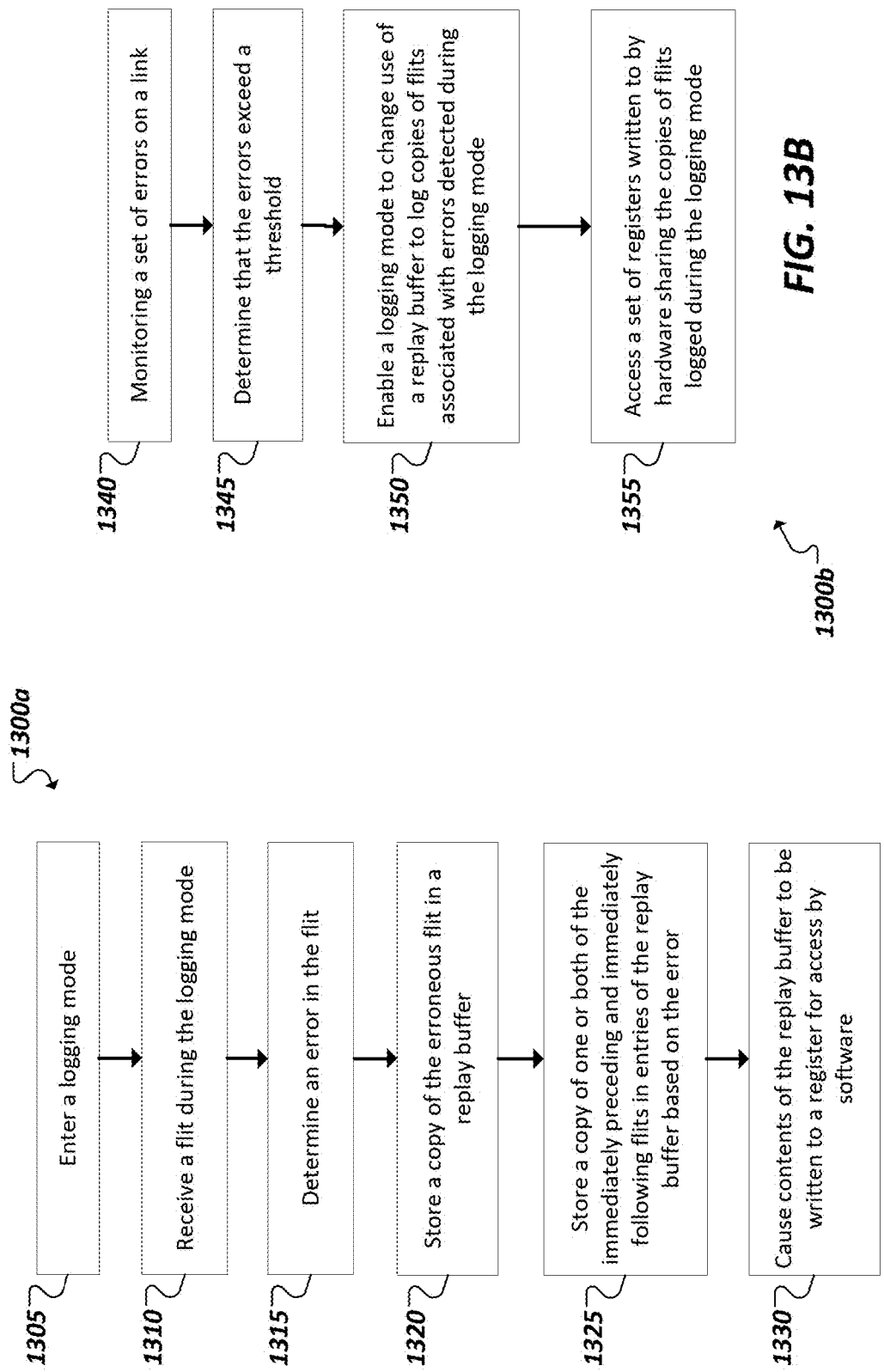
FIGS. 13A-13B are flowcharts illustrating example techniques for error logging using a replay buffer in an example logging mode.

FIGS. 13A-13B are flowchart 1300a-b illustrating an example logging mode utilizing a PHY replay buffer of a port to log errors detected on a link while the logging mode is enabled. For instance, in FIG. 13A, an error logging mode is entered 1305 to transform the operating mode of an RX replay buffer from its normal operating mode (e.g., to facilitate the receipt and proper processing of replayed flits on the link) to the logging mode. Flits may be received in either the normal operating mode or the logging mode, although the storage of flits in the replay buffer changes based on the currently enabled mode. In the logging mode, a particular flit may be received 1310 and checked to determine 1315 whether an error is present in the particular flit. If the particular flit is erroneous, a copy of the particular flit is stored 1320 in an entry within the replay buffer (e.g., an entry matching the defined size of the flit). Further, protocol circuitry (e.g., logical PHY circuitry) may additionally write copies of either or both the flit immediately preceding or the flit immediately following particular flit in respective entries of the replay buffer based on determining the error 1315 in the particular flit. These flit copies may serve as log data for the error. The contents of the replay buffer entries may be transferred (at 1330) from the replay buffer to a register (e.g., a snapshot configuration register) to allow software to read and analyze the signals represented in the flit copies to determine how to improve errors on the link in future operation of the link.

In the example of FIG. 13B, software, such as system software, software scripts, test software, or another program used to manage a platform may be utilized to control a logging mode. For instance, the occurrence of errors on a particular link may be monitored 1340 to identify the reporting of a set of errors detected on the link (e.g., by PHY-level error detection logic). The software may monitor the occurrence of these errors to determine 1345 a threshold level of errors has been met or exceeded. Based on this, the software may launch 1350 a specialized logging mode to transform a PHY replay buffer from its normal mode of operation to the logging mode, where copies of flits associated with errors (detected during the logging mode) are logged in the replay buffer to capture a snapshot of the signals causing or otherwise associated with errors occurring on the link. The contents of the replay buffer may be transferred or written to a set of one or more registers (e.g., configuration registers) associated with the link. Software may then access 1355 this set of registers to retrieve the copies of the flits logged based on the detected errors in the logging mode. Software may use this data to assess and improve performance of the link (e.g., by changing equalization parameters used to train and configure the link and thereby reduce errors occurring on one or more lanes of the link), among other example implementations and features.

Note that the apparatus', methods', and systems described above may be implemented in any electronic device or system as aforementioned. As specific illustrations, the figures below provide exemplary systems for utilizing the concepts as described herein. As the systems below are described in more detail, a number of different interconnects are disclosed, described, and revisited from the discussion above. And as is readily apparent, the advances described above may be applied to any of those interconnects, fabrics, or architectures.

Figure 14:
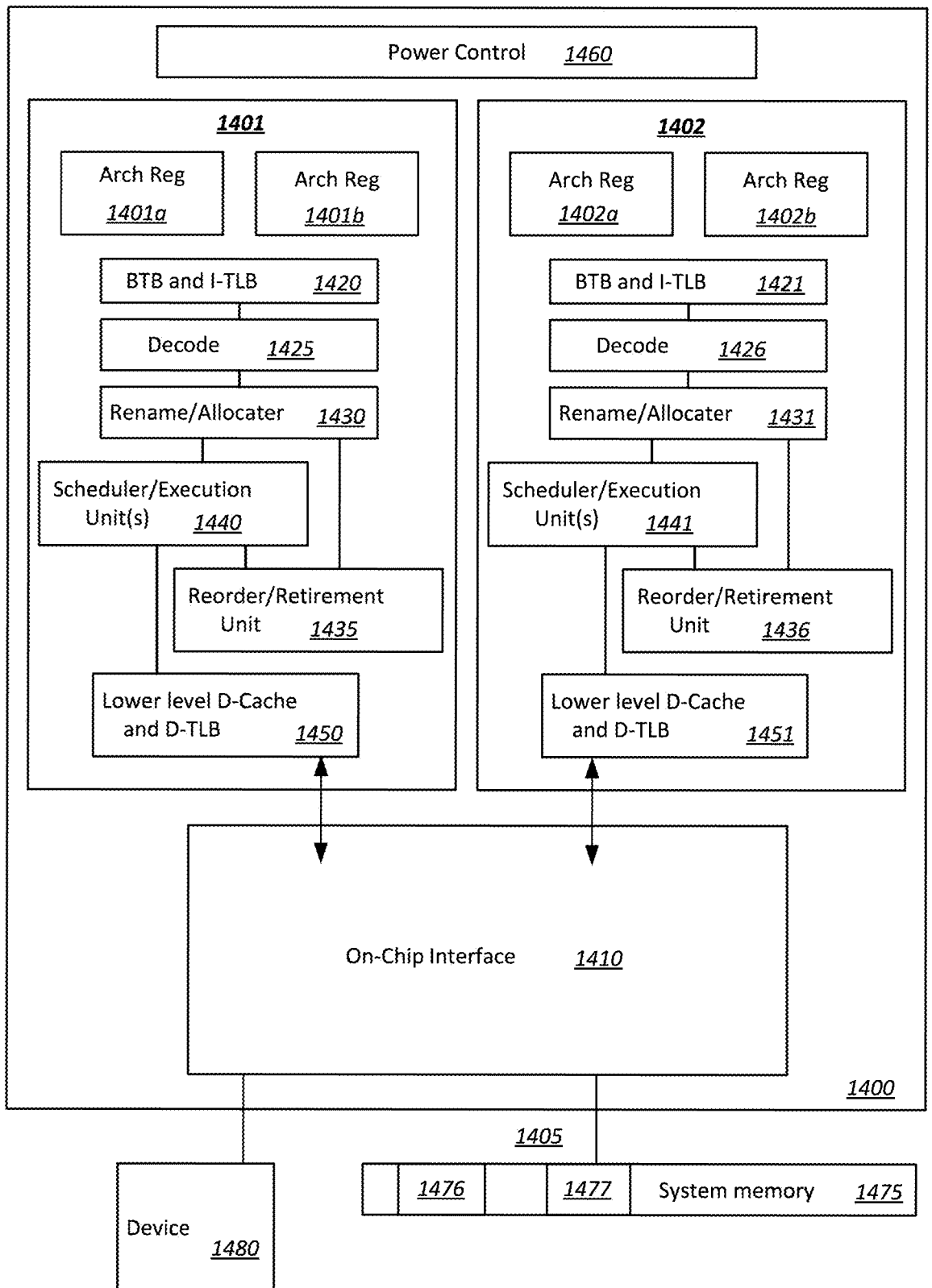
FIG. 14 illustrates an embodiment of a block diagram for a computing system including a multicore processor.

Referring to FIG. 14, an embodiment of a block diagram for a computing system including a multicore processor is depicted. Processor 1400 includes any processor or processing device, such as a microprocessor, an embedded processor, a digital signal processor (DSP), a network processor, a handheld processor, an application processor, a co-processor, a system on a chip (SOC), or other device to execute code. Processor 1400, in one embodiment, includes at least two cores—core 1401 and 1402, which may include asymmetric cores or symmetric cores (the illustrated embodiment). However, processor 1400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1400, as illustrated in FIG. 14, includes two cores—core 1401 and 1402. Here, cores 1401 and 1402 are considered symmetric cores, i.e., cores with the same configurations, functional units, and/or logic. In another embodiment, core 1401 includes an out-of-order processor core, while core 1402 includes an in-order processor core. However, cores 1401 and 1402 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as a binary translation, may be utilized to schedule or execute code on one or both cores. Yet to further the discussion, the functional units illustrated in core 1401 are described in further detail below, as the units in core 1402 operate in a similar manner in the depicted embodiment.

As depicted, core 1401 includes two hardware threads 1401a and 1401b, which may also be referred to as hardware thread slots 1401a and 1401b. Therefore, software entities, such as an operating system, in one embodiment potentially view processor 1400 as four separate processors, i.e., four logical processors or processing elements capable of executing four software threads concurrently. As alluded to above, a first thread is associated with architecture state registers 1401a, a second thread is associated with architecture state registers 1401b, a third thread may be associated with architecture state registers 1402a, and a fourth thread may be associated with architecture state registers 1402b. Here, each of the architecture state registers (e.g., 1401a, 1401b, 1402a, and 1402b) may be referred to as processing elements, thread slots, or thread units, as described above. As illustrated, architecture state registers 1401a are replicated in architecture state registers 1401b, so individual architecture states/contexts are capable of being stored for logical processor 1401a and logical processor 1401b. In core 1401, other smaller resources, such as instruction pointers and renaming logic in allocator and renamer block 1430 may also be replicated for threads 1401a and 1401b. Some resources, such as re-order buffers in reorder/retirement unit 1435, ILTB 1420, load/store buffers, and queues may be shared through partitioning. Other resources, such as general-purpose internal registers, page-table base register(s), low-level data-cache and data-TLB 1415, execution unit(s) 1440, and portions of out-of-order unit 1435 are potentially fully shared.

Processor 1400 often includes other resources, which may be fully shared, shared through partitioning, or dedicated by/to processing elements. In FIG. 14, an embodiment of a purely exemplary processor with illustrative logical units/resources of a processor is illustrated. Note that a processor may include, or omit, any of these functional units, as well as include any other known functional units, logic, or firmware not depicted. As illustrated, core 1401 includes a simplified, representative out-of-order (OOO) processor core. But an in-order processor may be utilized in different embodiments. The OOO core includes a branch target buffer 1420 to predict branches to be executed/taken and an instruction-translation buffer (I-TLB) 1420 to store address translation entries for instructions.

Core 1401 further includes decode module 1425 coupled to fetch unit 1420 to decode fetched elements. Fetch logic, in one embodiment, includes individual sequencers associated with thread slots 1401a, 1401b, respectively. Usually, core 1401 is associated with a first ISA, which defines/specifies instructions executable on processor 1400. Often machine code instructions that are part of the first ISA include a portion of the instruction (referred to as an opcode), which references/specifies an instruction or operation to be performed. Decode logic 1425 includes circuitry that recognizes these instructions from their opcodes and passes the decoded instructions on in the pipeline for processing as defined by the first ISA. For example, as discussed in more detail below decoders 1425, in one embodiment, include logic designed or adapted to recognize specific instructions, such as transactional instruction. As a result of the recognition by decoders 1425, the architecture or core 1401 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1426, in one embodiment, recognize the same ISA (or a subset thereof). Alternatively, in a heterogeneous core environment, decoders 1426 recognize a second ISA (either a subset of the first ISA or a distinct ISA).

In one example, allocator and renamer block 1430 includes an allocator to reserve resources, such as register files to store instruction processing results. However, threads 1401a and 1401b are potentially capable of out-of-order execution, where allocator and renamer block 1430 also reserves other resources, such as reorder buffers to track instruction results. Unit 1430 may also include a register renamer to rename program/instruction reference registers to other registers internal to processor 1400. Reorder/retirement unit 1435 includes components, such as the reorder buffers mentioned above, load buffers, and store buffers, to support out-of-order execution and later in-order retirement of instructions executed out-of-order.

Scheduler and execution unit(s) block 1440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower-level data cache and data translation buffer (D-TLB) 1450 are coupled to execution unit(s) 1440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1401 and 1402 share access to higher-level or further-out cache, such as a second level cache associated with on-chip interface 1410. Note that higher-level or further-out refers to cache levels increasing or getting further way from the execution unit(s). In one embodiment, higher-level cache is a last-level data cache—last cache in the memory hierarchy on processor 1400—such as a second or third level data cache. However, higher level cache is not so limited, as it may be associated with or include an instruction cache. A trace cache—a type of instruction cache—instead may be coupled after decoder 1425 to store recently decoded traces. Here, an instruction potentially refers to a macro-instruction (i.e. a general instruction recognized by the decoders), which may decode into a number of micro-instructions (micro-operations).

In the depicted configuration, processor 1400 also includes on-chip interface module 1410. Historically, a memory controller, which is described in more detail below, has been included in a computing system external to processor 1400. In this scenario, on-chip interface 1410 is to communicate with devices external to processor 1400, such as system memory 1475, a chipset (often including a memory controller hub to connect to memory 1475 and an I/O controller hub to connect peripheral devices), a memory controller hub, a northbridge, or other integrated circuit. And in this scenario, bus 1405 may include any known interconnect, such as multi-drop bus, a point-to-point interconnect, a serial interconnect, a parallel bus, a coherent (e.g., cache coherent) bus, a layered protocol architecture, a differential bus, and a GTL bus.

Memory 1475 may be dedicated to processor 1400 or shared with other devices in a system. Common examples of types of memory 1475 include DRAM, SRAM, non-volatile memory (NV memory), and other known storage devices. Note that device 1480 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1400. For example, in one embodiment, a memory controller hub is on the same package and/or die with processor 1400. Here, a portion of the core (an on-core portion) 1410 includes one or more controller(s) for interfacing with other devices such as memory 1475 or a graphics device 1480. The configuration including an interconnect and controllers for interfacing with such devices is often referred to as an on-core (or un-core configuration). As an example, on-chip interface 1410 includes a ring interconnect for on-chip communication and a high-speed serial point-to-point link 1405 for off-chip communication. Yet, in the SOC environment, even more devices, such as the network interface, co-processors, memory 1475, graphics processor 1480, and any other known computer devices/interface may be integrated on a single die or integrated circuit to provide small form factor with high functionality and low power consumption.

In one embodiment, processor 1400 is capable of executing a compiler, optimization, and/or translator code 1477 to compile, translate, and/or optimize application code 1476 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 15:
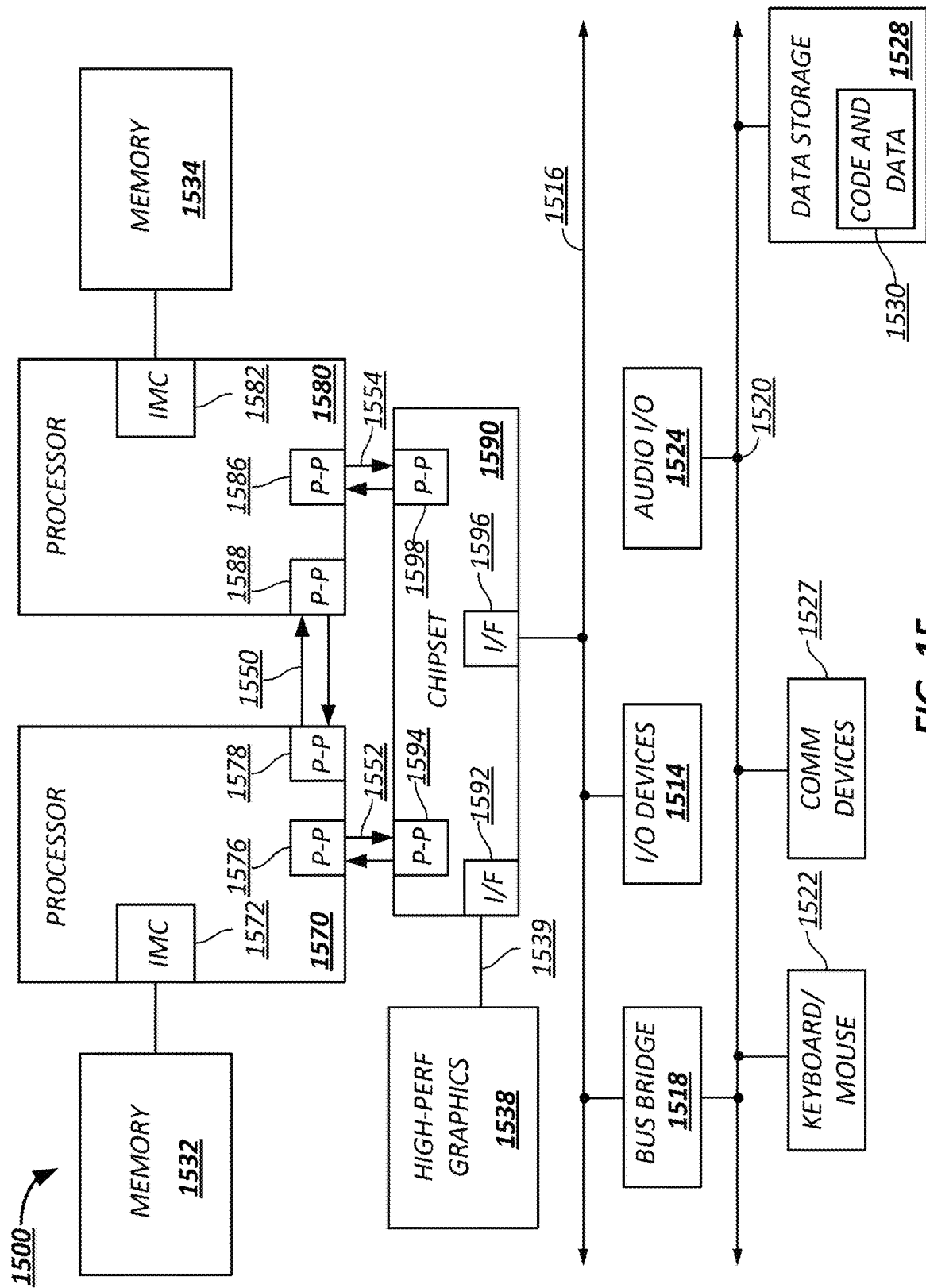
FIG. 15 illustrates another embodiment of a block diagram for a computing system.

Referring now to FIG. 15, shown is a block diagram of a second system 1500 in accordance with an embodiment of the present disclosure. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of a processor. In one embodiment, 1552 and 1554 are part of a serial, point-to-point coherent interconnect fabric.

While shown with only two processors 1570, 1580, it is to be understood that the scope of the present disclosure is not so limited. In other embodiments, one or more additional processors may be present in a given processor.

Processors 1570 and 1580 are shown including integrated memory controller units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 each exchange information with a chipset 1590 via individual P-P interfaces 1552, 1554 using point to point interface circuits 1576, 1594, 1586, 1598. Chipset 1590 also exchanges information with a high-performance graphics circuit 1538 via an interface circuit 1592 along a high-performance graphics interconnect 1539.

A shared cache (not shown) may be included in either processor or outside of both processors; yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present disclosure is not so limited.

As shown in FIG. 15, various I/O devices 1514 are coupled to first bus 1516, along with a bus bridge 1518 which couples first bus 1516 to a second bus 1520. In one embodiment, second bus 1520 includes a low pin count (LPC) bus. Various devices are coupled to second bus 1520 including, for example, a keyboard and/or mouse 1522, communication devices 1527 and a storage unit 1528 such as a disk drive or other mass storage device which often includes instructions/code and data 1530, in one embodiment. Further, an audio I/O 1524 is shown coupled to second bus 1520. Note that other architectures are possible, where the included components and interconnect architectures vary. For example, instead of the point-to-point architecture of FIG. 15, a system may implement a multi-drop bus or other such architecture.

Computing systems can include various combinations of components. These components may be implemented as ICs, portions thereof, discrete electronic devices, or other modules, logic, hardware, software, firmware, or a combination thereof adapted in a computer system, or as components otherwise incorporated within a chassis of the computer system. However, it is to be understood that some of the components shown may be omitted, additional components may be present, and different arrangement of the components shown may occur in other implementations. As a result, the solutions described above may be implemented in any portion of one or more of the interconnects illustrated or described below.

A processor, in one embodiment, includes a microprocessor, multi-core processor, multithreaded processor, an ultra-low voltage processor, an embedded processor, or other known processing element. In the illustrated implementation, processor acts as a main processing unit and central hub for communication with many of the various components of the system. As one example, processor is implemented as a system on a chip (SoC). As a specific illustrative example, processor includes an Intel® Architecture Core™-based processor such as an i3, i5, i7 or another such processor available from Intel Corporation, Santa Clara, CA However, understand that other low power processors such as available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instruction set that performs defined algorithms as set forth by the processor licensor. Here, the microarchitectural implementation may vary, but the architectural function of the processor is usually consistent. Certain details regarding the architecture and operation of processor in one implementation will be discussed further below to provide an illustrative example.

Processor, in one embodiment, communicates with a system memory. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (13P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDWIMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage may also couple to processor. In various embodiments, to enable a thinner and lighter system design as well as to improve system responsiveness, this mass storage may be implemented via an SSD. However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. A flash device may be coupled to processor, e.g., via a serial peripheral interface (SPI). This flash device may provide for non-volatile storage of system software, including a basic input/output software (BIOS) as well as other firmware of the system.

In various embodiments, mass storage of the system is implemented by an SSD alone or as a disk, optical or other drive with an SSD cache. In some embodiments, the mass storage is implemented as an SSD or as an HDD along with a restore (RST) cache module. In various implementations, the HDD provides for storage of between 320 GB-4 terabytes (TB) and upward while the RST cache is implemented with an SSD having a capacity of 24 GB-256 GB. Note that such SSD cache may be configured as a single level cache (SLC) or multi-level cache (MLC) option to provide an appropriate level of responsiveness. In an SSD-only option, the module may be accommodated in various locations such as in a mSATA or NGFF slot. As an example, an SSD has a capacity ranging from 120 GB-1 TB.

Various peripheral devices may couple to processor via a low pin count (LPC) interconnect. In the embodiment shown, various components can be coupled through an embedded controller. Such components can include a keyboard (e.g., coupled via a PS2 interface), a fan, and a thermal sensor. In some embodiments, touch pad may also couple to EC via a PS2 interface. In addition, a security processor such as a trusted platform module (TPM) in accordance with the Trusted Computing Group (TCG) TPM Specification Version 1.2, dated Oct. 2, 2003, may also couple to processor via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full-size SD-XC card reader and/or a SIM card reader for WWAN (e.g., an 8-pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System can communicate with external devices in a variety of manners, including wirelessly. In some instances, various wireless modules, each of which can correspond to a radio configured for a particular wireless communication protocol, are present. One manner for wireless communication in a short range such as a near field may be via a near field communication (NFC) unit which may communicate, in one embodiment with processor via an SMBus. Note that via this NFC unit, devices in close proximity to each other can communicate. For example, a user can enable system to communicate with another (e.g.,) portable device such as a smartphone of the user via adapting the two devices together in close relation and enabling transfer of information such as identification information payment information, data such as image data or so forth. Wireless power transfer may also be performed using an NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

Further, additional wireless units can include other short-range wireless engines including a WLAN unit and a Bluetooth unit. Using WLAN unit, Wi-Fi™ communications in accordance with a given Institute of Electrical and Electronics Engineers (IEEE) 802.11 standard can be realized, while via Bluetooth unit, short range communications via a Bluetooth protocol can occur. These units may communicate with processor via, e.g., a USB link or a universal asynchronous receiver transmitter (UART) link. Or these units may couple to processor via an interconnect according to a Peripheral Component Interconnect Express™ (PCIe™) protocol, e.g., in accordance with the PCI Express' Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit which in turn may couple to a subscriber identity module (SIM). In addition, to enable receipt and use of location information, a GPS module may also be present. WWAN unit and an integrated capture device such as a camera module may communicate via a given USB protocol such as a USB 2.0 or 3.0 link, or a UART or I$^2$C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11 ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition, NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high-resolution camera, e.g., having a resolution of at least 2.0 megapixels (MP) and extending to 6.0 MP and beyond.

To provide for audio inputs and outputs, an audio processor can be implemented via a digital signal processor (DSP), which may couple to processor via a high definition audio (HDA) link. Similarly, DSP may communicate with an integrated coder/decoder (CODEC) and amplifier that in turn may couple to output speakers which may be implemented within the chassis. Similarly, amplifier and CODEC can be coupled to receive audio inputs from a microphone which in an embodiment can be implemented via dual array microphones (such as a digital microphone array) to provide for high quality audio inputs to enable voice-activated control of various operations within the system. Note also that audio outputs can be provided from amplifier/CODEC to a headphone jack.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC may be sent to the PCH instead of the processor during the connected standby state so that the PCH can manage the wakeup processing instead of the processor. In addition, the TSC is maintained in the PCH to facilitate sustaining processor architectural functions.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

While the concepts above have been described with respect to a limited number of embodiments, those skilled in the art will appreciate numerous modifications and variations therefrom. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The following examples pertain to embodiments in accordance with this Specification. Example 1 is an apparatus including: a port to couple to another device over a serial point-to-point link, where the port includes: a replay buffer; and protocol circuitry to: receive a flit in a sequence of flits to be sent on a point-to-point link; determine an error in the flit; store a copy of the flit in a first position within the replay buffer based on the error; receive a next flit in the sequence of flits; store a copy of the next flit in a second position within the replay buffer based on the error in the flit; and cause the copies of the flit and the next flit to be written to register for access by software. In some implementations, the apparatus may be a processor device and included in a server system with the other device.

Example 2 includes the subject matter of example 1, where the protocol circuitry is further to: transition from a normal operating mode to a logging mode, where the protocol circuitry is to fill the replay buffer with a series of flits in the normal operating mode for use in replay operations involving one or more of the series of flits.

Example 3 includes the subject matter of example 2, where the transition from the normal operating mode to the logging mode includes draining at least a portion of the replay buffer to allow logging of the flit and the next flit in association with discovery an error in the flit.

Example 4 includes the subject matter of any one of examples 2-3, where the transition from the normal operating mode to the logging mode is based on a value written to a configuration register associated with the link by software.

Example 5 includes the subject matter of example 4, where the value is written based on a determination by the software that a threshold number of errors on the link has been met.

Example 6 includes the subject matter of any one of examples 2-5, where the replay buffer comprises a receiver (RX) replay buffer, and the RX replay buffer buffers all valid flits received at the port when in the normal operating mode while awaiting a replay of another received flit.

Example 7 includes the subject matter of any one of examples 1-6, where the protocol circuitry includes physical layer circuitry to implement a logical physical layer for the link.

Example 8 includes the subject matter of any one of examples 1-7, where the flit is received during runtime operation of the link.

Example 9 includes the subject matter of any one of examples 1-8, where the protocol circuitry is further to: receive a prior flit immediately before the flit in the sequence of flits; and store a copy of the prior flit in a third position within the replay buffer based on the error.

Example 10 includes the subject matter of example 9, where the prior flit includes a valid flit and replaces another valid flit immediately preceding the prior flit in the sequence of flits based on both the prior flit and the other valid flit being valid.

Example 11 includes the subject matter of any one of examples 9-10, where the protocol circuitry is further to:

identify either a corrected version or a replayed version of the flit; and store the either a corrected version or a replayed version of the flit in a fourth position of the replay buffer based on the error.

Example 12 includes the subject matter of example 11, where the protocol circuitry is further to: identify either a corrected version or a replayed version of the next flit; and store another copy of the next flit in a fifth position of the replay buffer based on the error, where the other copy of the next flit identifies whether the next flit also has an error or not.

Example 13 includes the subject matter of example 12, where the first position, the second position, the third position, the fourth position, and the fifth position are logically related in the replay buffer to indicate that data stored in each of the first position, the second position, the third position, the fourth position, and the fifth position pertain to the error.

Example 14 includes the subject matter of any one of examples 1-13, where the flit is received during a test of the link and the sequence of flits is generated by a test signal generator.

Example 15 includes the subject matter of any one of examples 1-14, where the link is compliant with a Peripheral Component Interconnect Express (PCIe)-based protocol.

Example 16 includes the subject matter of example 15, where the error is determined based on one of a forward error correction (FEC) code or a cyclic redundancy check (CRC) code in the flit.

Example 17 includes the subject matter of any one of examples 1-16, where the link is compliant with one of a Compute Express Link (CXL), Gen-Z, or UltraPath Interconnect (UPI) protocol.

Example 18 includes the subject matter of any one of examples 1-17, where copies of flits in the sequence of flits not associated with an error condition are not logged in the replay buffer during the logging mode.

Example 19 is a method including: monitoring a set of errors on a link, where the set of errors are described in a set of registers associated with the link, and the link includes a serial point-to-point link connecting a first device to a second device; determining that the set of errors exceeds a threshold; enabling a logging mode by a logical physical layer on one of the first or second devices based on determining that the set of errors exceeds the threshold, where flits sent on the link that are determined to have an error are logged in a replay buffer associated with the logical physical layer in the logging mode; and accessing the set of registers to collect copies of the flits determined to have an error and logged during the logging mode.

Example 20 includes the subject matter of example 19, further including performing an analysis of the copies of the flits to determine an adjustment to be made to configuration of the link to reduce subsequent errors on the link.

Example 21 includes the subject matter of any one of examples 19-20, where the logging mode at the logical physical layer is enabled by setting a value in the set of registers.

Example 22 includes the subject matter of any one of examples 19-21, where the set of registers includes a first register to describe the set of errors, a second register to set the value to enable the logging mode at the logical physical layer, and a third register to collect the copies of the flits.

Example 23 includes the subject matter of any one of examples 21-22, where the replay buffer comprises a receive (RX) replay buffer.

Example 24 includes the subject matter of example 23, where the RX replay buffer transitions from a normal operating mode to the logging mode, and the RX replay buffer buffers all valid flits received at the port when in the normal operating mode while awaiting a replay of another received flit.

Example 25 is a system including means to perform the method of any one of examples 19-24.

Example 26 is a non-transitory machine-readable storage medium with instructions stored thereon, the instructions executable by a machine to cause the machine to: monitor a set of errors on a link, wherein the set of errors are described in a set of registers associated with the link, and the link comprises a serial point-to-point link connecting a first device to a second device; determine that the set of errors exceeds a threshold; enable a logging mode by a logical physical layer on one of the first or second devices based on determining that the set of errors exceeds the threshold, wherein flits sent on the link that are determined to have an error are logged in a replay buffer associated with the logical physical layer in the logging mode; and access the set of registers to collect copies of the flits determined to have an error and logged during the logging mode.

Example 27 includes the subject matter of example 26, wherein the instructions are further executable to cause a machine to perform an analysis of the copies of the flits to determine an adjustment to be made to configuration of the link to reduce subsequent errors on the link.

Example 28 includes the subject matter of any one of examples 26-27, where the logging mode at the logical physical layer is enabled by setting a value in the set of registers.

Example 29 includes the subject matter of any one of examples 26-28, where the set of registers includes a first register to describe the set of errors, a second register to set the value to enable the logging mode at the logical physical layer, and a third register to collect the copies of the flits.

Example 30 includes the subject matter of any one of examples 26-29, where the replay buffer comprises a receive (RX) replay buffer.

Example 31 includes the subject matter of example 30, where the RX replay buffer transitions from a normal operating mode to the logging mode, and the RX replay buffer buffers all valid flits received at the port when in the normal operating mode while awaiting a replay of another received flit.

Example 32 is a system including: a first device; a second device connected to the first device by a link, where the second device includes a port to couple to the link, where the port includes: a replay buffer; and protocol circuitry to: transition to a logging mode during operation of the link; receive a particular flit in a sequence of flits to be sent on the link during the logging mode; determine an error in the particular flit; store a copy of the flit in a first position within the replay buffer based on the error; receive a next flit in the sequence of flits; store a copy of the next flit in a second position within the replay buffer based on the error in the flit; and cause the copies of the flit and the next flit to be written to a set of registers for access by system software.

Example 33 includes the subject matter of example 32, further including a set of registers and the system software, where the system software is executable to: monitor a set of errors on the link as reported by the protocol circuitry in a set of registers associated with the link; determine that the set of errors exceeds a threshold; enable the logging mode by setting a value in the set of registers; and access the set of registers to collect copies of the flits determined to be associated with the error and logged during the logging mode.

Example 34 includes the subject matter of any one of examples 32-33, where copies of flits in the sequence of flits not associated with an error condition are not logged in the replay buffer during the logging mode.

Example 35 includes the subject matter of any one of examples 32-34, where the first device and second device are devices in a runtime computing platform.

Example 36 includes the subject matter of example 35, where the runtime computing platform includes a server system.

Example 37 includes the subject matter of any one of examples 35-36, where one of the first or the second device includes a processor device and the other of the first or the second device includes one of an I/O device, a memory device, or an accelerator device.

Example 38 includes the subject matter of any one of examples 35-36, where the first device includes a first processor and the second device includes a second processor.

Example 39 includes the subject matter of any one of examples 32-38, where the second device includes test pattern generation logic and the sequence of flits include flits generated by the first device includes a tester device.

Example 40 includes the subject matter of any one of examples 32-39, where the logging mode is transitioned from a normal operation mode, where the protocol circuitry is to fill the replay buffer with a series of flits in the normal operating mode for use in replay operations involving one or more of the series of flits.

Example 41 includes the subject matter of example 40, where the transition from the normal operating mode to the logging mode includes draining at least a portion of the replay buffer to allow logging of the flit and the next flit in association with discovery an error in the flit.

Example 42 includes the subject matter of any one of examples 40-41, where the transition from the normal operating mode to the logging mode is based on a value written to the set of registers by the system software.

Example 43 includes the subject matter of example 42, where the value is written based on a determination by the system software that a threshold number of errors on the link has been met.

Example 44 includes the subject matter of any one of examples 32-43, where the replay buffer comprises a receiver (RX) replay buffer, and the RX replay buffer buffers all valid flits received at the port when in the normal operating mode while awaiting a replay of another received flit.

Example 45 includes the subject matter of any one of examples 32-44, where the protocol circuitry includes physical layer circuitry to implement a logical physical layer for the link.

Example 46 includes the subject matter of any one of examples 32-45, where the flit is received during runtime operation of the link.

Example 47 includes the subject matter of any one of examples 32-46, where the protocol circuitry is further to: receive a prior flit immediately before the flit in the sequence of flits; and store a copy of the prior flit in a third position within the replay buffer based on the error.

Example 48 includes the subject matter of example 47, where the prior flit includes a valid flit and replaces another valid flit immediately preceding the prior flit in the sequence of flits based on both the prior flit and the other valid flit being valid.

Example 49 includes the subject matter of any one of examples 47-48, where the protocol circuitry is further to: identify either a corrected version or a replayed version of the flit; and store the either a corrected version or a replayed version of the flit in a fourth position of the replay buffer based on the error.

Example 50 includes the subject matter of example 49, where the protocol circuitry is further to: identify either a corrected version or a replayed version of the next flit; and store another copy of the next flit in a fifth position of the replay buffer based on the error, where the other copy of the next flit identifies whether the next flit also has an error or not.

Example 51 includes the subject matter of example 50, where the first position, the second position, the third position, the fourth position, and the fifth position are logically related in the replay buffer to indicate that data stored in each of the first position, the second position, the third position, the fourth position, and the fifth position pertain to the error.

Example 52 includes the subject matter of any one of examples 32-51, where the flit is received during a test of the link and the sequence of flits is generated by a test signal generator.

Example 53 includes the subject matter of any one of examples 32-52, where the link is compliant with a Peripheral Component Interconnect Express (PCIe)-based protocol.

Example 54 includes the subject matter of any one of examples 32-53, where the error is determined based on one of a forward error correction (FEC) code or a cyclic redundancy check (CRC) code in the flit.

Example 66 includes the subject matter of any one of examples 32-54, where the link is compliant with one of a Compute Express Link (CXL), Gen-Z, or UltraPath Interconnect (UPI) protocol.

Example 56 includes the subject matter of any one of examples 32-55, where copies of flits in the sequence of flits not associated with an error condition are not logged in the replay buffer during the logging mode.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a port to couple to another device over a serial point-to-point link, wherein the port comprises:
   a replay buffer; and
   protocol circuitry to:
      receive a flit in a sequence of flits to be sent on a point-to-point link;
      determine an error in the flit;
      store a copy of the flit in a first position within the replay buffer based on the error;
      receive a next flit in the sequence of flits;
      store a copy of the next flit in a second position within the replay buffer based on the error in the flit; and
      cause the copies of the flit and the next flit to be written from the replay buffer to a register for access by software.

2. The apparatus of claim 1, wherein the protocol circuitry is further to:
   transition from a normal operating mode to a logging mode, wherein the protocol circuitry is to fill the replay buffer with a series of flits in the normal operating mode for use in replay operations involving one or more of the series of flits, the transition from the normal operating mode to the logging mode comprises draining at least a portion of the replay buffer to allow logging of the flit and the next flit in association with discovery an error in the flit.

3. The apparatus of claim 2, wherein the transition from the normal operating mode to the logging mode is based on a determination by the software that a threshold number of errors on the link has been met.

4. The apparatus of claim 1, wherein the flit is received during runtime operation of the link.

5. The apparatus of claim 1, wherein the protocol circuitry is further to:
   receive a prior flit immediately before the flit in the sequence of flits; and
   store a copy of the prior flit in a third position within the replay buffer based on the error.

6. The apparatus of claim 5, wherein the prior flit comprises a valid flit and replaces another valid flit immediately preceding the prior flit in the sequence of flits based on both the prior flit and the other valid flit being valid.

7. The apparatus of claim 5, wherein the protocol circuitry is further to:
   identify either a corrected version or a replayed version of the flit; and
   store the either a corrected version or a replayed version of the flit in a fourth position of the replay buffer based on the error.

8. The apparatus of claim 7, wherein the protocol circuitry is further to:
   identify either a corrected version or a replayed version of the next flit; and
   store another copy of the next flit in a fifth position of the replay buffer based on the error, wherein the other copy of the next flit identifies whether the next flit also has an error or not.

9. The apparatus of claim 8, wherein the first position, the second position, the third position, the fourth position, and the fifth position are logically related in the replay buffer to indicate that data stored in each of the first position, the second position, the third position, the fourth position, and the fifth position pertain to the error.

10. The apparatus of claim 9, wherein the error is determined based on one of a forward error correction (FEC) code or a cyclic redundancy check (CRC) code in the flit.

11. The apparatus of claim 1, wherein the flit is received during a test of the link and the sequence of flits is generated by a test signal generator.

12. The apparatus of claim 1, wherein the link is compliant with a Peripheral Component Interconnect Express (PCIe)-based protocol.

13. A method comprising:
   monitoring a set of errors on a link, wherein the set of errors are described in a set of registers associated with the link, and the link comprises a serial point-to-point link connecting a first device to a second device;
   determining that the set of errors exceeds a threshold;
   enabling a logging mode by a logical physical layer on one of the first or second devices based on determining that the set of errors exceeds the threshold, wherein flits sent on the link that are determined to have an error are logged in a replay buffer associated with the logical physical layer in the logging mode; and
   accessing the set of registers to collect copies of the flits determined to have an error and logged during the logging mode.

14. The method of claim 13, further comprising performing an analysis of the copies of the flits to determine an adjustment to be made to configuration of the link to reduce subsequent errors on the link.

15. The method of claim 13, wherein the logging mode at the logical physical layer is enabled by setting a value in the set of registers.

16. The method of claim 15, wherein the set of registers comprises a first register to describe the set of errors, a second register to set the value to enable the logging mode at the logical physical layer, and a third register to collect the copies of the flits.

17. A system comprising:
a first device;
a second device connected to the first device by a link, wherein the second device comprises a port to couple to the link, wherein the port comprises:
a replay buffer; and
protocol circuitry to:
transition to a logging mode during operation of the link;
receive a particular flit in a sequence of flits to be sent on the link during the logging mode;
determine an error in the particular flit;
store a copy of the flit in a first position within the replay buffer based on the error;
receive a next flit in the sequence of flits;
store a copy of the next flit in a second position within the replay buffer based on the error in the flit; and
cause the copies of the flit and the next flit to be written to a set of registers for access by system software.

18. The system of claim 17, further comprising a set of registers and the system software, wherein the system software is executable to:
monitor a set of errors on the link as reported by the protocol circuitry in a set of registers associated with the link;
determine that the set of errors exceeds a threshold;
enable the logging mode by setting a value in the set of registers; and
access the set of registers to collect copies of the flits determined to be associated with the error and logged during the logging mode.

19. The system of claim 17, wherein copies of flits in the sequence of flits not associated with an error condition are not logged in the replay buffer during the logging mode.

20. The system of claim 17, wherein the first device and second device are devices in a runtime computing platform, and the runtime computing platform comprises a server system.

* * * * *